(12) United States Patent
Nakajima

(10) Patent No.: US 8,638,465 B2
(45) Date of Patent: Jan. 28, 2014

(54) IMAGING FORMING APPARATUS WITH CUSTOMIZABLE USER INTERFACES AND IMPROVED TEXT LANGUAGE PROCESSING

(71) Applicant: Kouki Nakajima, Osaka (JP)

(72) Inventor: Kouki Nakajima, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 13/679,826

(22) Filed: Nov. 16, 2012

(65) Prior Publication Data
US 2013/0271784 A1 Oct. 17, 2013

Related U.S. Application Data

(60) Division of application No. 13/568,669, filed on Aug. 7, 2012, now Pat. No. 8,467,084, which is a continuation of application No. 12/239,274, filed on Sep. 26, 2008, now abandoned.

(30) Foreign Application Priority Data

| Sep. 28, 2007 | (JP) | 2007-253070 |
|---|---|---|
| Sep. 28, 2007 | (JP) | 2007-253071 |
| Sep. 28, 2007 | (JP) | 2007-253072 |
| Sep. 28, 2007 | (JP) | 2007-253073 |
| Sep. 28, 2007 | (JP) | 2007-253074 |
| Sep. 28, 2007 | (JP) | 2007-253075 |
| Sep. 28, 2007 | (JP) | 2007-253076 |
| Sep. 28, 2007 | (JP) | 2007-253077 |
| Oct. 18, 2007 | (JP) | 2007-270784 |
| Oct. 18, 2007 | (JP) | 2007-270785 |
| Oct. 18, 2007 | (JP) | 2007-270786 |
| Oct. 18, 2007 | (JP) | 2007-270787 |
| Oct. 18, 2007 | (JP) | 2007-270788 |
| Oct. 30, 2007 | (JP) | 2007-281541 |
| Jul. 11, 2008 | (JP) | 2008-181641 |
| Jul. 11, 2008 | (JP) | 2008-181642 |
| Aug. 20, 2008 | (JP) | 2008-211766 |

(51) Int. Cl.
G06F 3/12 (2006.01)
G06K 15/00 (2006.01)

(52) U.S. Cl.
USPC .................................... 358/1.15; 358/1.13

(58) Field of Classification Search
USPC ............ 358/1.1, 1.13, 1.15, 1.18; 705/26, 81
See application file for complete search history.

(56) References Cited

U.S. PATENT DOCUMENTS

| 7,599,947 | B1 * | 10/2009 | Tolbert et al. | 1/1 |
|---|---|---|---|---|
| 7,734,689 | B2 * | 6/2010 | Richer et al. | 709/203 |
| 2007/0100967 | A1 * | 5/2007 | Smith et al. | 709/219 |
| 2007/0265813 | A1 * | 11/2007 | Unal et al. | 703/2 |

* cited by examiner

Primary Examiner — Gabriel Garcia

(57) ABSTRACT

An image forming apparatus includes a processor, a storage unit that stores a text language processing program, an operational panel, a communication interface, and an input unit. A user application stored in the includes descriptions on (a) a conditioned reset statement with a first condition expression including an input value from the input unit and (b) a pair of (b1) at least on process executing statement and (b2) an attribution of an icon to be displayed on either a remote console via the communication interface or the operation panel. The text language processing program causes the processor (a) to interpret the user application, (b) to determine whether the first condition expression is satisfied, (c) to detect a user operation to the icon, if a result of the determination is a predetermined one, and (d) upon detecting the user operation, to execute the at least one process executing statement.

8 Claims, 22 Drawing Sheets

FIG. 2

```
<wsdl:definitions
    targetNamespace="http://www.xxxx.com/ws/scan"
    xmlns:scn="http://www.xxxx.com/ws/scan"
    xmlns:soapenc="http://schemas.xmlsoap.org/soap/encoding/"
    xmlns:wsa="http://www.w3.org/2005/08/addressing"
    xmlns:wsdl="http://schemas.xmlsoap.org/wsdl/"
    xmlns:wsdlsoap="http://schemas.xmlsoap.org/wsdl/soap/"
    xmlns:xsd="http://www.w3.org/2001/XMLSchema">

<wsdl:types>
    <schema targetNamespace="http://www.xxxx.com"
                    xmlns="http://www.w3.org/2001/XMLSchema">
      <include schemaLocation="scan.xsd"/>
    </schema>
  </wsdl:types>

<wsdl:message name="send_request">
    <wsdl:part name="Request" element="scn:send_request"/>
  </wsdl:message>

<wsdl:message name="send_response">
    <wsdl:part name="Response" element="scn:send_response"/>
  </wsdl:message>

<wsdl:portType name="scan">
   <wsdl:operation name = "send" >
    <wsdl:input message="scn:send_request_Msg"  name="send_request"
       wsa:Action="http://www.xxxx.com/ws/send_request"/>
    <wsdl:output message="scn:send_response_Msg"  name="send_response"
       wsa:Action="http://www.xxxx.com/ws/send_response"/>
   </wsdl:operation>
  </wsdl:portType>

<wsdl:binding name="ScanSoapBinding"  type="scn:scan">
    <wsdlsoap:binding style="document"
                    transport="http://schemas.xmlsoap.org/soap/http"/>
    <wsdl:operation name="send">
      <wsdlsoap:operation soapAction="http://www.xxxx.com/ws/scan"/>
      <wsdl:input name="send_request">
        <wsdlsoap:body use="literal"/>
      </wsdl:input>
      <wsdl:output name="send_response">
        <wsdlsoap:body use="literal"/>
      </wsdl:output>
    </wsdl:operation>
  </wsdl:binding>

<wsdl:service name="ScanService">
    <wsdl:port binding="scn:ScanSoapBinding"  name="scan">
      <wsdlsoap:address location="http://localhost/scan"/>
    </wsdl:port>
  </wsdl:service>

</wsdl:definitions>
```

FIG. 3

```xml
<xsd:schema
  targetNamespace="http://www.xxxx.com/ws/scan"
  xmlns:xsd="http://www.w3.org/2001/XMLSchema"
  xmlns:scn="http://www.xxxx.com/ws/scan"
  elementFormDefault="qualified"
  attributeFormDefault="qualified">

<xsd:simpleType name="RESULT">
  <xsd:restriction base="xsd:string">
   <xsd:enumeration value="SUCCESS"/>
   <xsd:enumeration value="JOB_CANCELED_ERROR"/>
   <xsd:enumeration value="JAM_OCCURRED_ERROR"/>
  </xsd:restriction>
 </xsd:simpleType>

<xsd:simpleType name="FILE_FORMAT">
  <xsd:restriction base="xsd:string">
   <xsd:enumeration value="PDF"/>
   <xsd:enumeration value="JPEG"/>
   <xsd:enumeration value="BMP"/>
  </xsd:restriction>
 </xsd:simpleType>

<xsd:simpleType name="OUTPUT_IMAGE_CONFIG">
  <xsd:sequence>
   <xsd:element name="file_format"
     type="scn:FILE_FORMAT" minOccurs="0" maxOccurs="unbounded"/>
   <xsd:element name="file_name"
     type="scn:FILE_NAME" minOccurs="0" maxOccurs="1"/>
  </xsd:sequence>
 </xsd:complexType>

<xsd:element name="send_request">
  <xsd:complexType>
   <xsd:sequence>
    <xsd:element name="send_address" type="xsd:string"/>
    <xsd:element name="image_config" type="scn:OUTPUT_IMAGE_CONFIG"/>
   </xsd:sequence>
  </xsd:complexType>
 </xsd:element>

<xsd:element name="send_response">
  <xsd:complexType>
   <xsd:sequence>
    <xsd:element name="result" type="scn:RESULT"/>
   </xsd:sequence>
  </xsd:complexType>
 </xsd:element>

</xsd:schema>
```

FIG. 4

```
<soapenv:Envelope>
 <soapenv:Body>
  <send_request>
   <send_address> xxx.xxx.yyy.yyy </send_address>
   <image_config>
    <file_format>PDF</file_format>
    <file_name>scan001</file_name>
   </image_config>
  </send_request>
 </soapenv:Body>
</soapenv:Envelope>
```

FIG. 5

```
<soapenv:Envelope>
 <soapenv:Body>
  <send_response>
   <result> SUCCESS </result>
  </send_response>
 </soapenv:Body>
</soapenv:Envelope>
```

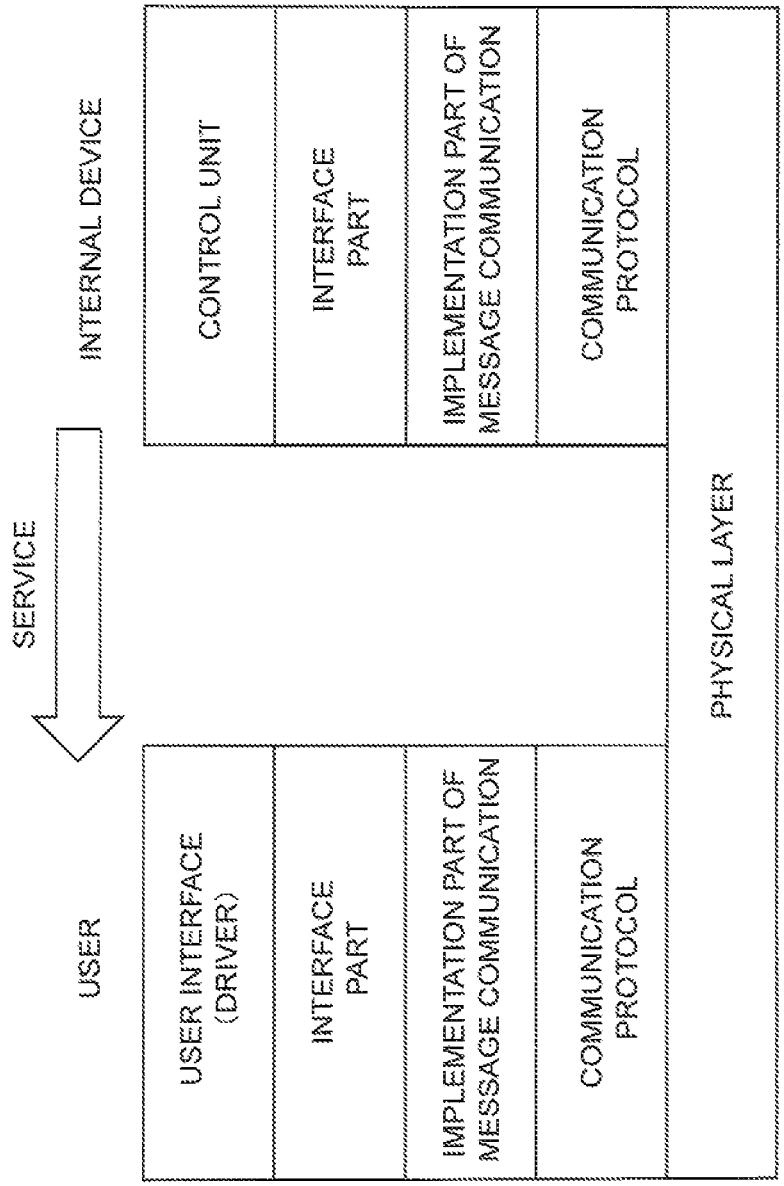

FIG. 8

```
<wsdl:definitions
   targetNamespace="http://www.xxxx.com/ws/panel"
   xmlns:pnl="http://www.xxxx.com/ws/panel"
   xmlns:soapenc="http://schemas.xmlsoap.org/soap/encoding/"
   xmlns:wsa="http://www.w3.org/2005/08/addressing"
   xmlns:wsdl="http://schemas.xmlsoap.org/wsdl/"
   xmlns:wsdlsoap="http://schemas.xmlsoap.org/wsdl/soap/"
   xmlns:xsd="http://www.w3.org/2001/XMLSchema">

<wsdl:types>
  <schema targetNamespace="http://www.xxxx.com"
   xmlns="http://www.w3.org/2001/XMLSchema">
    <include schemaLocation="panel.xsd"/>
  </schema>
</wsdl:types>

<wsdl:message name="send_request">
  <wsdl:part name="Request" element="pnl:send_request"/>
</wsdl:message>

<wsdl:message name="send_response">
  <wsdl:part name="Response" element="pnl: send_response"/>
</wsdl:message>

<wsdl:portType name="panel">
 <wsdl:operation name = "button_adding" >
   <wsdl:input message="pnl:button_request_Msg" name="button_request"
   wsa:Action="http://www.xxxx.com/ws/button_request"/>
   <wsdl:output message="pnl:button_response_Msg"
   name="button_response"
   wsa:Action="http://www.xxxx.com/ws/button_response"/>
 </wsdl:operation>
 ...
</wsdl:portType>

<wsdl:binding name="PanelSoapBinding" type="pnl:panel">
  <wsdlsoap:binding style="document"
  transport="http://schemas.xmlsoap.org/soap/http"/>
  <wsdl:operation name="button_adding">
    <wsdlsoap:operation soapAction="http://www.xxxx.com/ws/panel"/>
    <wsdl:input name="button_request">
      <wsdlsoap:body use="literal"/>
    </wsdl:input>
    <wsdl:output name="button_response">
      <wsdlsoap:body use="literal"/>
    </wsdl:output>
  </wsdl:operation>
  ...
</wsdl:binding>

<wsdl:service name="PanelService">
  <wsdl:port binding="pnl:PanelSoapBinding" name="panel">
    <wsdlsoap:address location="http://localhost/panel"/>
  </wsdl:port>
</wsdl:service>
</wsdl:definitions>
```

FIG. 9

```
<xsd:schema
    targetNamespace="http://www.xxxx.com/ws/panel"
    xmlns:xsd="http://www.w3.org/2001/XMLSchema"
    xmlns:scn="http://www.xxxx.com/ws/panel"
    elementFormDefault="qualified"
    attributeFormDefault="qualified">

<xsd:simpleType name="BUTTON">
    <xsd:complexType>
      <xsd:sequence>
        <xsd:element name="button_name" type="xsd:string" />
        <xsd:element name="button_string" type="xsd:string" />
        <xsd:element name="button_top" type="xsd:string" />
        <xsd:element name="button_left" type="xsd:string" />
        <xsd:element name="button_hight" type="xsd:string" />
        <xsd:element name="button_width" type="xsd:string" />
      </xsd:sequence>
    </xsd:complexType>
  </xsd:simpleType>

<xsd:element name="button_request">
    <xsd:complexType>
      <xsd:sequence>
        <xsd:element name="screen_name" type="xsd:string"/>
        <xsd:element name="event_button" type="panel:BUTTON"/>
        <xsd:element name="procedure_string" type="xsd:string"/>
      </xsd:sequence>
    </xsd:complexType>
  </xsd:element>

...

</xsd:schema>
```

FIG. 11

```xml
<screen>
  <screen_name>Setting</screen_name>
  <screen_title>
    <title_string>SETTING</title_string>
    <title_top>10</title_top>
    <title_left>20</title_left>
  </screen_title>
  <button>
    <event_button>
      <button_name>copy</button_name>
      <button_string>COPY</button_string>
      <button_top>30</button_top>
      <button_left>15</button_left>
      <button_hight>45</button_hight>
      <button_width>15</button_width>
    </event_button>
    <procedure_string>openCopySetting</procedure_string>
  </button>
  <button>
    <event_button>
      <button_name>facsimile</button_name>
      <button_string>FAX</button_string>
      <button_top>30</button_top>
      <button_left>75</button_left>
      <button_hight>55</button_hight>
      <button_width>15</button_width>
    </event_button>
    <procedure_string>openFacsimileSetting</procedure_string>
  </button>
  <button>
    <event_button>
      <button_name>printer</button_name>
      <button_string>PRINTER</button_string>
      <button_top>30</button_top>
      <button_left>145</button_left>
      <button_hight>45</button_hight>
      <button_width>15</button_width>
    </event_button>
    <procedure_string>openPrinterSetting</procedure_string>
  </button>
  ...
</screen>
```

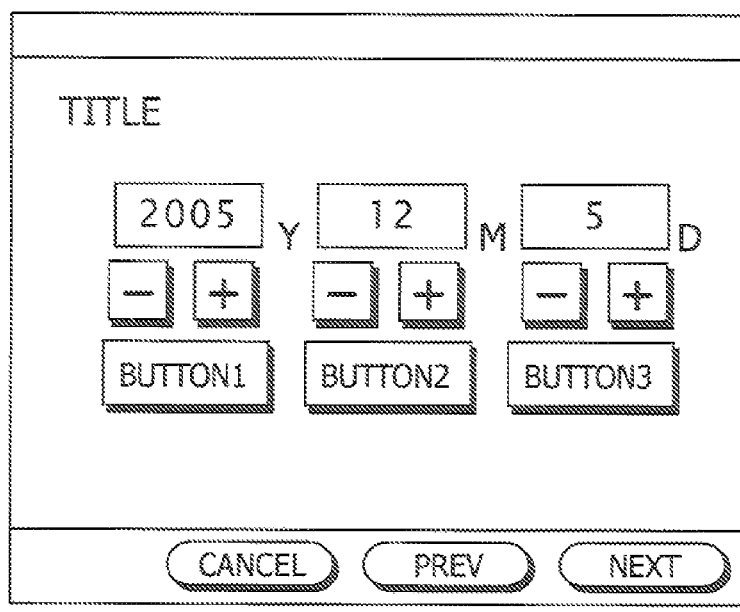

FIG. 17

```
<soapenv:Envelope>
  <soapenv:Body>
    <button_request>
      <screen_name>facsimileSetting</screen_name>
      <event_button>
        <button_name>update</button_name>
        <button_string>UPDATE</button_string>
        <button_top>30</button_top>
        <button_left>20</button_left>
        <button_hight>20</button_hight>
        <button_width>50</button_width>
      </event_button>
      <procedure_string>updateFacsimileSetting</procedure_string>
    </send_request>
  </soapenv:Body>
</soapenv:Envelope>
```

FIG. 18

```
<soapenv:Envelope>
  <soapenv:Body>
    <button_response>
      <result> SUCCESS </result>
    </button_response>
  </soapenv:Body>
</soapenv:Envelope>
```

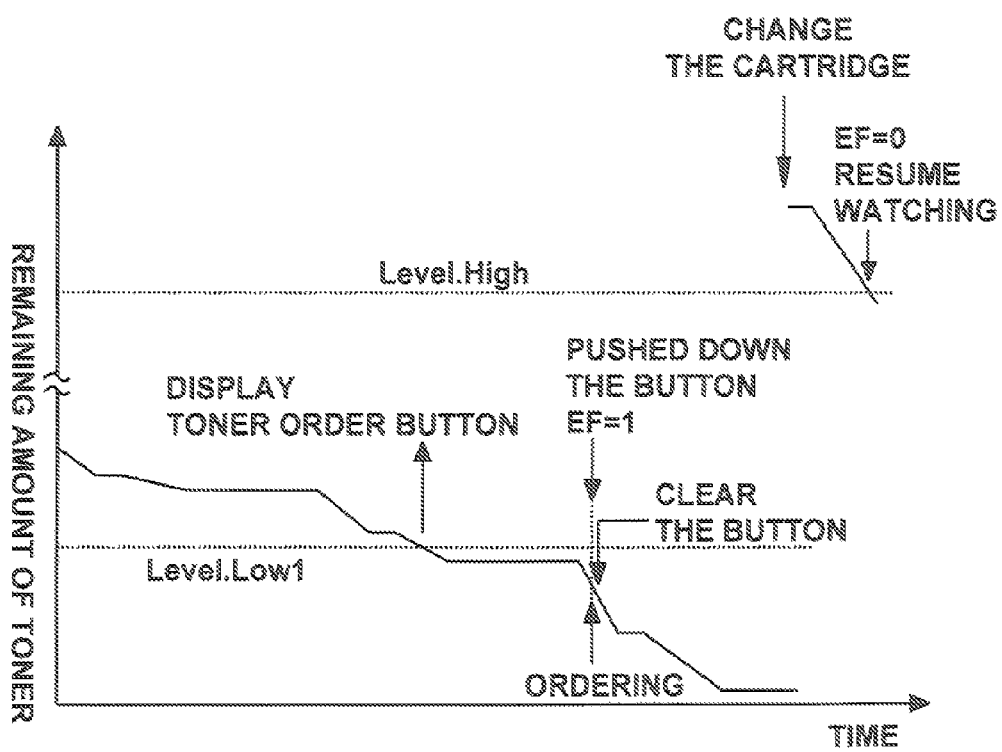

FIG. 23A

```
L.C
 0  ResetEnd(Toner.Level>Level.High);
 1  If Toner.Level<Level.Low1 {
 2    Button (120, 80, 60, 30, CARTRIDGE ORDER & CrLf & REMAIN & Toner.Level.ToPages & SHEETS)
 3      Order (Toner.RFID To DefaultDealer);
 4    End;
 5
 6  }
 7
```

FIG. 23B

```
ResetEnd(Toner.Level>Level.High);
If Toner.Level<Level.Low1 {
  Button (120, 80, 60, 30, CARTRIDGE ORDER & CrLf & REMAIN & Toner.Level.ToPages & SHEETS) {
    Fax cartridgeOrderFile.pdf to ADDRESSBOOK(dealer1, fax);
  End;

```
ResetEnd(Toner.Level>Level.High);
If Toner.Level<Level.Low1 {
  Button (120, 80, 60, 30, CARTRIDGE ORDER & CrLf & REMAIN & Toner.Level.ToPages & SHEETS) {
    Email cartridgeOrderFile.pdf to ADDRESSBOOK(dealer1, email);
  End;

```
Button (20, 30, 60, 30, SLIP TRASMISSION) {
    file.pdf=Scan;
    Fax file.pdf to ADDRESSBOOK(HEADQUARTER ACCOUNTING DEPARTMENT, fax);
    Email file.pdf to ADDRESSBOOK(TARO SASAKI, email);
}
```

```
Button (20, 30, 60, 30, SLIP TRASMISSION) {
    file.pdf=Scan;
    Fax file.pdf to ADDRESSBOOK(HEADQUARTER ACCOUNTING DEPARTMENT, fax);
    Email file.pdf to ADDRESSBOOK(TARO SASAKI, email);
    End;
}
```

FIG. 24C

```
ResetEnd(ICcardID=KM01);
Button (20, 30, 60, 30, SLIP TRASMISSION) {
    file.pdf=Scan;
    Fax file.pdf to ADDRESSBOOK(HEADQUARTER ACCOUNTING DEPARTMENT, fax);
    Email file.pdf to ADDRESSBOOK(TARO SASAKI, email);
    End;
}
```

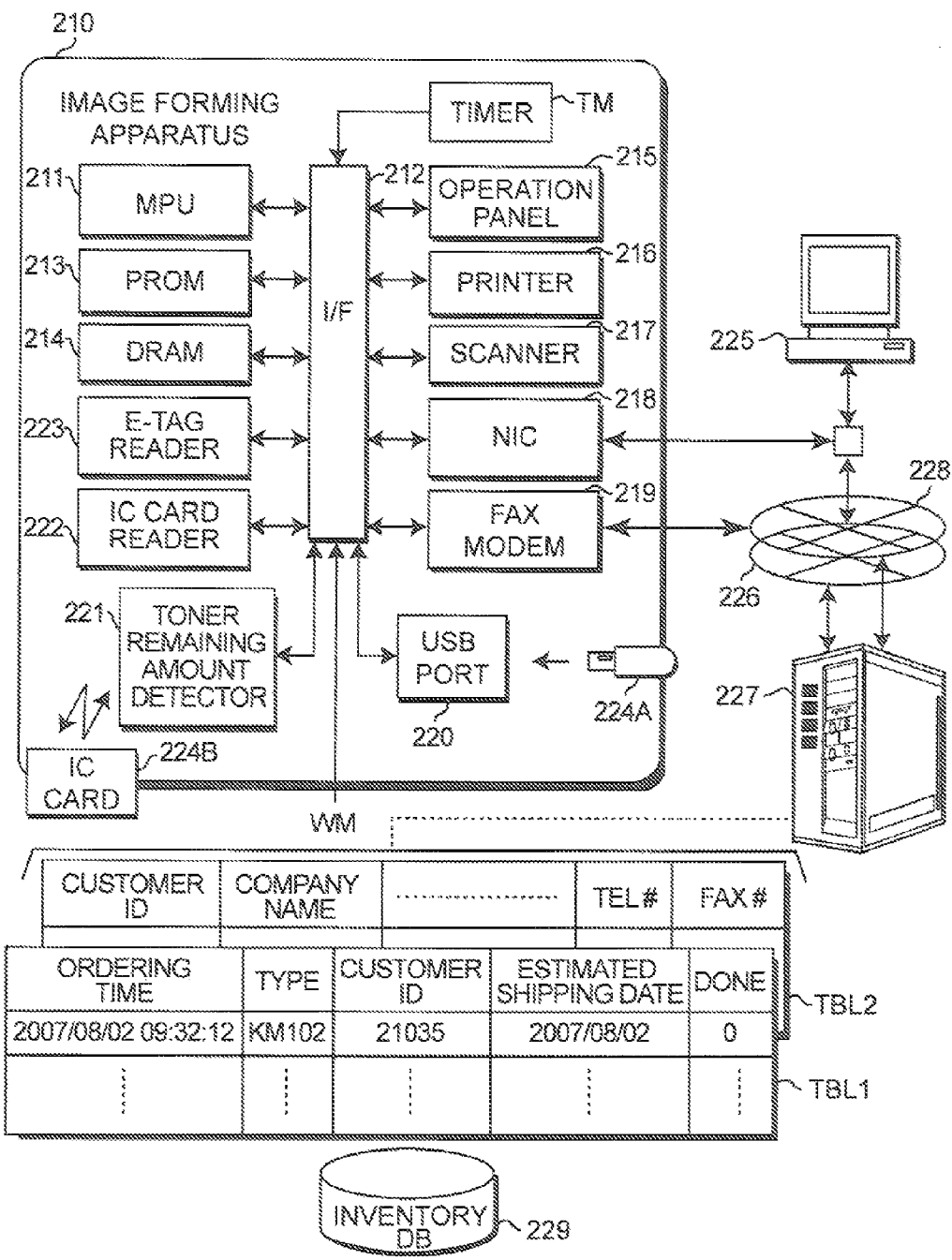

IMAGING FORMING APPARATUS WITH CUSTOMIZABLE USER INTERFACES AND IMPROVED TEXT LANGUAGE PROCESSING

CROSS-REFERENCE TO RELATED APPLICATIONS

This application is a divisional application of U.S. application Ser. No. 13/568,669 filed on Aug. 7, 2012. U.S. application Ser. No. 13/568,669 is a continuation application of U.S. application Ser. No. 12/239,274, filed on Sep. 26, 2008. This application and the parent applications relate to and claims priority rights from Japanese Patent Applications:

(1) Japanese Patent Application No. 2008-181641, filed on Jul. 11, 2008
(2) Japanese Patent Application No. 2008-181642, filed on Jul. 11, 2008
(3) Japanese Patent Application No. 2008-211766, filed on Aug. 20, 2008
(4) Japanese Patent Application No. 2007-253070, filed on Sep. 28, 2007
(5) Japanese Patent Application No. 2007-253071, filed on Sep. 28, 2007
(6) Japanese Patent Application No. 2007-253073, filed on Sep. 28, 2007
(7) Japanese Patent Application No. 2007-253074, filed on Sep. 28, 2007
(8) Japanese Patent Application No. 2007-253072, filed on Sep. 28, 2007
(9) Japanese Patent Application No. 2007-253075, filed on Sep. 28, 2007
(10) Japanese Patent Application No. 2007-253076, filed on Sep. 28, 2007
(11) Japanese Patent Application No. 2007-253077, filed on Sep. 28, 2007
(12) Japanese Patent Application No. 2007-270788, filed on Oct. 18, 2007
(13) Japanese Patent Application No. 2007-270786, filed on Oct. 18, 2007
(14) Japanese Patent Application No. 2007-270787, filed on Oct. 18, 2007
(15) Japanese Patent Application No. 2007-270784, filed on Oct. 18, 2007
(16) Japanese Patent Application No. 2007-270785, filed on Oct. 18, 2007
(17) Japanese Patent Application No. 2007-281541, filed on Oct. 30, 2007
the entire disclosures of which are hereby incorporated by reference herein.

BACKGROUND OF THE INVENTION

1. Field of the Invention
This invention relates to image forming apparatus and image forming system.
2. Description of the Related Art
In a direction text for operating an image forming apparatus, directions for performing services are described in XML (Extensible Markup Language). In a system, the direction texts have been stored in a server device, and upon selecting one of the direction texts, one or more services described in the selected direction text are performed by one or more job executing devices. In the direction text described in XML, setting parameters can be described.
An image forming apparatus such as multi function peripheral has an operation panel that contains a display device and an input device. This display device displays a user interface screen. The user interface screen mainly has components such as button. The user interface screen is displayed in terms of program control. In general, a program is generated by compiling a source file described in a programming language such as C or Java with API (Application Program Interface) in the image forming apparatus. The program has been stored in advance as an executable program.

SUMMARY OF THE INVENTION

In case that the direction texts have been stored, if sorts of parameters, the number of parameters, permissible values of parameters, or the like want to be changed, all direction texts related to the change have to be re-generated and stored. Further, communication procedures and formats of messages for transmitting/receiving the direction text are pre-defined and used between devices. Therefore, if the communication procedures and the formats of messages want to be changed, designs of the devices have to be changed considerably.

Furthermore, a program for displaying a user interface screen is generated by compiling a source file described in a programming language. Therefore, in order to customize the user interface screen, a development environment is necessary to generate an executable program from a source program in the programming language, and it is difficult for other people than programmers to change the source file.

This invention has been made in view of the aforementioned circumstances. It is an object of the present invention to provide an image forming apparatus in which significant changes are not necessary even if a specification of messages used for services is changed. In addition, it is an object of the present invention to provide an image forming apparatus and an image forming system in which a user interface screen can be customized easily.

The present invention solves these subjects as follows.

An image forming apparatus according to an aspect of the present invention contains: an internal device that performs a service; a message processing unit that parses a message according to service definition data, the service definition data including (a) syntax definitions of an interface part of the service and (b) designation of a protocol to be used for the service; and a control unit that controls the internal device according to a request obtained from a result of parsing the message by the message processing unit in order to perform the service.

In this apparatus, messages are parsed according to the service definition data. Therefore, a specification of the messages can be changed by changing the service definition data. In the service definition data, (a) syntax definitions of an interface part of a service and (b) designation of a protocol to be used for the service are described separately. Thus, it is possible to change a specification of messages without changing the interface part to be used to call the service. Significant changes in the apparatus are not required to change a specification of messages used for services.

Further, the aforementioned image forming apparatus may contain a receiving unit that receives the message via a computer network according to a communication protocol, and the message processing unit parses the message received by the receiving unit.

Further, in the aforementioned image forming apparatus, the message processing unit may generate a message indicating a result of the service according to the service definition data.

In this apparatus, messages are generated according to the service definition data. Therefore, a specification of the messages can be changed by changing the service definition data.

In the service definition data, (a) syntax definitions of an interface part of a service and (b) designation of a protocol to be used for the service are described separately. Thus, it is possible to change a specification of messages without changing the interface part to be used to call the service. Significant changes in the apparatus are not required to change a specification of messages used for services.

Further, the aforementioned image forming apparatus may contain a receiving unit that receives a message via a computer network according to a communication protocol, and a transmitting unit that transmits a message via the computer network; the message processing unit may parse a message received by the receiving unit; the message processing unit may generate a message indicating a result of the service performed according to a request obtained from a result of parsing the message received by the receiving unit; and the transmitting unit may transmit the message generated by the message processing unit.

Further, in the aforementioned image forming apparatus, the protocol designated in the service definition data may be SOAP, the receiving unit may receive the message according to HTTP, and the transmitting unit may transmit the message according to HTTP.

Further, in the aforementioned image forming apparatus, the service definition data may be XML data described in WSDL.

Further, in the aforementioned image forming apparatus, the service definition data may include schema data, the schema data includes syntax definitions of the message to be received or transmitted, and the message processing unit may parse the message according to the service definition data and the schema data.

Therefore, it is possible to change a specification of messages by changing the schema data without changing the interface part used to call a service.

Further, in the aforementioned image forming apparatus, the service definition data may include a reference to schema data, and the message processing unit may read out the schema data with the reference and parse the message according to the service definition data and the schema data.

Therefore, it is possible to change a specification of messages by changing the schema data without changing the interface part used to call a service.

Further, in the aforementioned image forming apparatus, the service definition data may be XML data described in WSDL, and the schema data may be XML data described in XML Schema.

An image forming system according to an aspect of the present invention contains: a terminal device connected to a computer network, and an image forming apparatus that is connected to the computer network and executes one or more services according to a request that occurs in the terminal device. The image forming apparatus comprises: a receiving unit that receives a request message via the computer network according to a communication protocol; an internal device that performs the one or more services; a message processing unit that parses the request message according to service definition data and schema data; and a control unit that controls the internal device according to a request obtained from a result of parsing the request message by the message processing unit in order to perform the service. The service definition data includes (a) syntax definitions of an interface part of the service and (b) designation of a protocol to be used for the service, and the schema data includes syntax definitions of the message. The terminal device obtains the service definition data and/or the schema data from the image forming apparatus, generates and transmits the request message to the image forming apparatus according to the service definition data and/or the schema data.

In this system, messages are parsed according to the service definition data. Therefore, a specification of the messages can be changed by changing the service definition data. In the service definition data, (a) syntax definitions of an interface part of a service and (b) designation of a protocol to be used for the service are described separately. Thus, it is possible to change a specification of messages without changing the interface part to be used to call the service. Significant changes in the apparatus are not required to change a specification of messages used for services. Moreover, the terminal device obtains the service definition data and/or schema data from the image forming apparatus that performs a service, and consequently the service definition data and/or schema data are/is not necessary to be stored in the terminal device in advance.

Further, in the aforementioned image forming system, the terminal device may distill permissible values of a parameter from the service definition data and/or the schema data, select one of the permissible values as a value of the parameter, and generate the request message including the value of the parameter.

Therefore, permissible values of the parameter are not necessary to be stored in the terminal device in advance.

Further, in the aforementioned image forming system, the image forming apparatus may contain a transmitting unit that transmits a message via the computer network according to the communication protocol. The message processing unit of the image forming apparatus may generate a response message indicating a result of the service performed according to a request obtained from a result of parsing the request message received by the receiving unit, and the transmitting unit of the image forming apparatus transmits the response message generated by the message processing unit, and the terminal device receives the response message.

Further, in the aforementioned image forming system, the protocol designated in the service definition data may be SOAP, the receiving unit may receive the message according to HTTP, and the transmitting unit may transmit the message according to HTTP.

Further, in the aforementioned image forming system, the service definition data may be XML data described in WSDL.

Further, in the aforementioned image forming apparatus, the service definition data may include schema data, and the message processing unit may parse the message according to the service definition data and the schema data.

Therefore, it is possible to change a specification of messages by changing the schema data without changing the interface part used to call a service.

Further, in the aforementioned image forming system, the service definition data may include a reference to schema data, and the message processing unit may read out the schema data with the reference and parse the message according to the service definition data and the schema data.

Therefore, it is possible to change a specification of messages by changing the schema data without changing the interface part used to call a service.

Further, in the aforementioned image forming apparatus, the service definition data may be XML data described in WSDL, and the schema data may be XML data described in XML Schema.

An image forming apparatus according to an aspect of the present invention contains: a display device that displays a user interface screen; a data storage device that stores user interface data containing attributions of components in the user interface screen; and a UI data parsing unit that identifies attributions of the components with parsing the user interface data, and causes the display device to display the user interface screen that reflects the attributions of the components. The user interface data is described as text data.

Therefore, it is possible to customize a user interface by editing user interface data in a text format. Consequently, it is possible to customize a user interface screen of the image forming apparatus easily.

Further, the aforementioned image forming apparatus may contain: a message processing unit that parses a message according to service definition data; and a control unit that performs the editing service according to a request obtained from a result of parsing the message by the message processing unit. The service definition data includes (a) syntax definitions of an interface part of an editing service of the user interface data and (b) designation of a protocol to be used for the service.

The image forming apparatus performs editing user interface data as a service, and therefore, it is possible to edit user interface data by transmitting a message from an external device to the image forming apparatus without operating the image forming apparatus directly. Consequently, it is possible to customize a user interface screen of the image forming apparatus easily.

Further, the aforementioned image forming apparatus may contain a receiving unit that receives the message via a computer network according a communication protocol, and the message processing unit may parse the message received by the receiving unit.

Further, in the aforementioned image forming apparatus, the protocol designated in the service definition data may be SOAP, and the receiving unit may receive the message according to HTTP.

Further, in the aforementioned image forming apparatus, the service definition data may be XML data described in WSDL.

Further, in the aforementioned image forming apparatus, the service definition data may include schema data, the schema data includes syntax definitions of the message to be received or transmitted, and the message processing unit may parse the message according to the service definition data and the schema data.

Further, in the aforementioned image forming apparatus, the user interface data and the message may be described in XML, and the control unit may update the user interface data with an XML text of the attributions of the components distilled by the message processing unit.

Therefore, conversion from a message to an XML text for the user interface data is not necessary.

An image forming system contains: an image forming apparatus connected to a computer network, and a terminal device connected to the computer network. The image forming apparatus contains: a display device that displays a user interface screen; a data storage device that stores user interface data containing attributions of components in the user interface screen; a UI data parsing unit that identifies attributions of the components with parsing the user interface data, and causes the display device to display the user interface screen that reflects the attributions of the components; a receiving unit that receives the message via the computer network according to a communication protocol; a message processing unit that parses a message according to service definition data, the service definition data including (a) syntax definitions of an interface part of an editing service of the user interface data and (b) designation of a protocol to be used for the service; and a control unit that executes the editing service according to a request obtained from a result of parsing the message by the message processing unit. The user interface data is described as text data. The terminal device comprises a transmitting unit that transmits the message via the computer network according to a communication protocol.

Therefore, it is possible to customize a user interface by editing user interface data in a text format. The image forming apparatus performs editing user interface data as a service, and therefore, it is possible to edit user interface data by transmitting a message from an external device to the image forming apparatus without operating the image forming apparatus directly. Consequently, it is possible to customize a user interface screen of the image forming apparatus easily.

Further, in the aforementioned image forming system, the data storage device may store schema data including syntax definitions of the message; the terminal device may contain a schema data obtaining unit that obtains a part or all of the schema data from the image forming apparatus and identifies one or more items in the attributions of the components with the part or all of the schema data; and the transmitting unit may transmit the message to set one or more values to a part or all of the one or more items identified by the schema data obtaining unit.

Therefore, it is possible to customize the image forming apparatus without storing items of the components in the terminal device in advance.

Further, in the aforementioned image forming system, the data storage device may store schema data including syntax definitions of the message; the terminal device may contain a schema data obtaining unit that obtains a part or all of the schema data from the image forming apparatus and identifies one or more permissible values on the attributions of the components with the part or all of the schema data; and the transmitting unit may transmit the message to set a value selected from the one or more permissible values to one of the attributions.

Therefore, it is possible to customize the image forming apparatus without storing attribution information of the components in the terminal device in advance.

Further, in the aforementioned image forming system, the user interface data and the message may be described in XML, the schema data may be XML data described in XML Schema, and the control unit may update the user interface data with an XML text of the attributions of the components distilled by the message processing unit.

Therefore, it is possible to customize the image forming apparatus without storing syntax definitions in the terminal device in advance.

Further, in the aforementioned image forming system, the data storage device may store template files containing respective default data of the user interface screen. The transmitting unit may select one of the template files and transmit the message to set default data in the selected template file as data of one of user interface screens in the user interface data.

Therefore, it is possible to execute complex customization easily with using the templates.

These and other objects, features and advantages of the present invention will become more apparent upon reading of the following detailed description along with the accompanied drawings.

BRIEF DESCRIPTION OF THE DRAWINGS

FIG. 2 shows a diagram that indicates an instance of service definition data described in WSDL;

FIG. 3 shows a diagram that indicates an instance of schema data referenced in service definition data;

FIG. 4 shows a diagram that indicates an instance of a request message in Embodiment 1 of the present invention;

FIG. 5 shows a diagram that indicates an instance of a response message in Embodiment 1 of the present invention;

FIG. 6 shows a diagram that indicates a layer structure of message communication process in Embodiment 1 of the present invention;

FIG. 8 shows a diagram that indicates an instance of service definition data described in WSDL;

FIG. 9 shows a diagram that indicates an instance of schema data referenced in service definition data;

FIG. 11 shows a diagram that indicates user interface data in which a user interface screen shown in FIG. 10 is described;

FIG. 16 shows a diagram that indicates a default screen displayed based on a template file;

FIG. 17 shows a diagram that indicates an instance of a request message in Embodiment 2 of the present invention;

FIG. 18 shows a diagram that indicates an instance of a response message in Embodiment 2 of the present invention;

FIG. 22 shows a diagram that indicates process of FIG. 19 along a graph of a remaining amount of toner in time series;

FIGS. 23A to 23C show diagrams that indicate specific instances of a user application for ordering a toner cartridge;

FIGS. 24A to 24C show diagrams that indicate specific instances of a user application for scanning a slip, facsimile transmission and email transmission;

FIG. 26 shows a schematic diagram that indicates a hardware configuration in the image forming apparatus of Embodiment 3.

DETAILED DESCRIPTION OF THE PREFERRED EMBODIMENT

Hereinafter, embodiments according to aspects of the present invention will be explained with reference to drawings.

Embodiment 1

Figure 1:
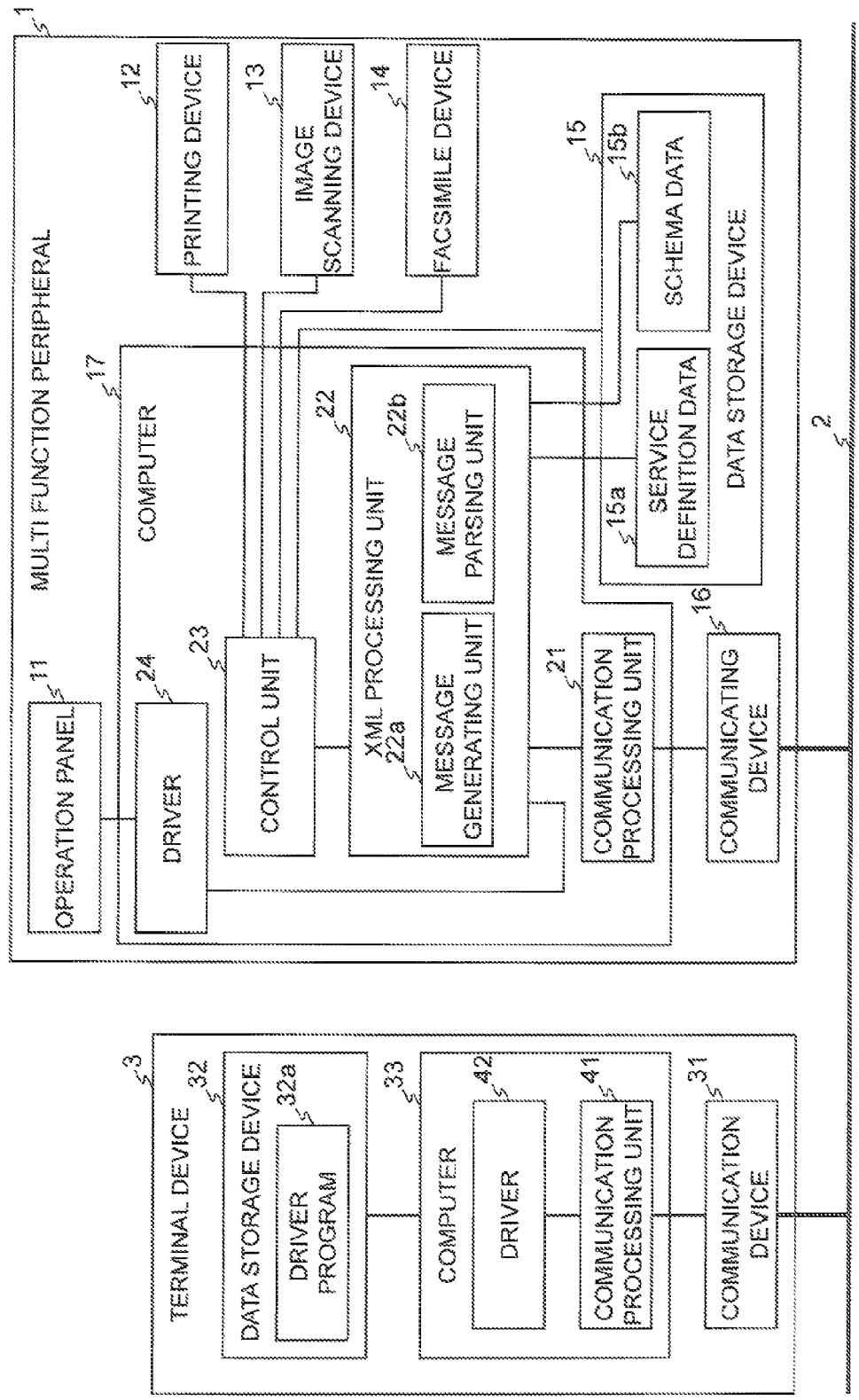
FIG. 1 shows a block diagram that indicates an image forming system including a multi function peripheral as an image forming apparatus according to Embodiment 1 of the present invention.

FIG. 1 shows a block diagram that indicates an image forming system including a multi function peripheral as an image forming apparatus according to Embodiment 1 of the present invention. In the system, a multi function peripheral 1 is connected to a computer network 2, and is used by either a terminal device 3 connected to the computer network 2 or a user who operates an operation panel 11 of the multi function peripheral 1. A user operation takes place to request to execute a service, and then a request message and a response message are transmitted either inside the multi function peripheral 1 or between the multi function peripheral 1 and the terminal device 3.

In FIG. 1, the multi function peripheral 1 has the operation panel 11, a printing device 12, an image scanning device 13, a facsimile device 14, a data storage device 15, a communicating device 16 and a computer 17.

The operation panel 11 is a user interface device that contains (a) a display device such as liquid crystal display, and (b) an input device that detects a physical user operation electronically. The input device may be key switches, a transparent touch panel placed on a screen of the display device, etc.

The printing device 12 is an internal device that prints a document image based on document data generated by the image scanning device 13, document data stored in a document box (not shown), document data received from the terminal device 3, or the like. The document data is image data in a predetermined format.

The image scanning device 13 is an internal device that scans an image of a document and outputs document data of the image. To scan the image of the document fed by an auto document feeder or put by a user, the image scanning device 13 radiates light to a single side or both sides of the document, and detects reflection light or the like from the document.

The facsimile device 14 is an internal device that has a modem, and transmits and receives facsimile signals. The facsimile device 14 generates a facsimile signal from document data generated by the image scanning device 13 or stored in the document box, and generates document data from a received facsimile signal.

The data storage device 15 is a device that stores service definition data 15a, schema data 15b, programs (not shown) to be executed by the computer 17, document data, etc. The data storage device 15 may be a device that drives readable/writable recording medium such as hard disk drive and/or non-volatile memory.

The service definition data 15a is text data that contains (a) syntax definitions of an interface part of a service, and (b) designation of protocol of messages to be used in the service. In the interface part, at least a call and a return value of the service are defined. The service definition data 15a is described in XML, for example. In addition, the service definition data 15a is described in WSDL, for example. It should be noted that the service definition data 15a is data that contains syntax definitions, and is not transmitted as a message. The service definition data 15a can be stored as either one file or a plurality of files. In the service definition data 15a, a schema language is used to describe the syntax definitions. In this embodiment, XML Schema is used to describe the syntax definitions in the service definition data 15a. The syntax definitions may be described in the service definition data 15a in XML Schema. Alternatively, a reference to external schema data 15b may be described in the service definition data 15a to read and use the schema data 15b.

The schema data 15b is external schema data referenced in the service definition data 15a. The schema data 15b is text data described in a predetermined language. The schema data 15b can be stored as either one file or a plurality of files.

FIG. 2 shows a diagram that indicates an instance of the service definition data 15a described in WSDL. FIG. 3 shows a diagram that indicates an instance of the schema data 15b referenced in the service definition data 15a.

The service definition data 15a shown in FIG. 2 contains syntax definitions of an image scanning service with the image scanning device 13. The service definition data 15a shown in FIG. 2 consists of a definition element of WSDL. A types element of WSDL is in the definition element, and an include element in the types element references the external schema data 15b, for instance, "scan.xsd" shown in FIG. 3. A message element and a portType element of WSDL are in the definitions element, and in the message element and the portType element, syntax definitions of both a request message and a response message are described as an interface part of the service. In FIG. 2, "send_request" is defined as a request message, and "send_response" is defined as a response message.

A binding element of WSDL is in the definitions element, and in the binding element, a protocol of messages used for the service is designated. In the binding element shown in FIG. 2, SOAP is designated as the protocol used for the messages.

In the schema data 15b shown in FIG. 3, defined are (a) syntax definitions of a request message and a response message, and (b) definitions of permissible values of parameters used in the messages. The syntax definitions of the messages are described as one or more element elements and one or more complexType elements of XML Schema (xsd), and a definition of the permissible values is described as a simpleType element of XML Schema (xsd).

As mentioned above, the service definition data 15a has been stored in advance for each of services. In addition, the external schema data 15b has been stored in advance if required.

The communicating device 16 is connected to the computer network 2, and is a device capable of communicating with another device (e.g. the terminal device 3) connected to the computer network 2. The communicating device 16 may be a network interface card, or the like.

The computer 17 has a CPU (Central Processing Unit), a RAM (Random Access Memory), a ROM (Read Only Memory) and other components, and is a device that loads a program to the RAM and executes the program with the CPU in order to realize processing units. The computer 17 realizes a communication processing unit 21, an XML processing unit 22, a control unit 23, and a driver 24 based on a program (not shown).

The communication processing unit 21 is a processing unit that controls the communicating device 16, and transmits/receives messages via the computer network 2 according to predetermined communication protocols. In this embodiment, since SOAP (Simple Object Access Protocol) is used as a message protocol, TCP/IP (Transmission Control Protocol/Internet Protocol) and HTTP (Hypertext Transfer Protocol) are used as communication protocols.

The XML processing unit 22 reads out the service definition data 15a described in WSDL (Web Services Description Language), and realizes a message generating unit 22a and a message parsing unit 22b based on the service definition data 15a. The message generating unit 22a generates messages according to syntax definitions described in the service definition data 15a. The messages are a response message that indicates a result of a service, a notification message, etc. The message parsing unit 22b parses messages according to syntax definitions described in the service definition data 15a. The messages are a request message that indicates a request of a service, etc. The message parsing unit 22b identifies a request described in the message based on a result of parsing the message.

The control unit 23 is a processing unit that controls internal devices to cause them to perform services according to a request identified by the XML processing unit 22, and obtains results of the services from the internal devices to provide the results to the XML processing unit 22. The internal devices such as the printing device 12, the image scanning device 13, and the facsimile device 14 have functions capable of performing the services.

The driver 24 is a driver of the operation panel 11, and is a processing unit that communicates with the XML processing unit 22 to transmit/receive messages in relation to information on a user operation input to the operation panel 11 and information on a screen to be displayed on the operation panel 11.

In FIG. 1, the terminal device 3 has a communicating device 31, a data storage device 32, and a computer 33. The terminal device 3 may be a personal computer, or the like.

The communicating device 31 is connected to the computer network 2, and is a device capable of communicating with another device (e.g. the multi function peripheral 1) connected to the computer network 2. The communication device 31 may be a network interface card, or the like.

The data storage device 32 is a device that stores programs to be executed by the computer 33, etc. In the data storage device 32, a driver program 32a has been stored. The data storage device 32 may be a device that drives a readable/writable recording medium such as hard disk drive and/or non-volatile memory.

The computer 33 has a CPU, a RAM, a ROM and other components, and is a device that loads a program to the RAM and executes the program with the CPU in order to realize processing units. The computer 32 realizes a communication processing unit 41 and a driver 42 based on the driver program 33a, etc.

The communication processing unit 41 is a processing unit that controls the communicating device 31, and transmits/receives messages via the computer network 2 according to predetermined communication protocols. In this embodiment, since SOAP messages are used as the messages, TCP/IP and HTTP are used as communication protocols.

The driver 42 is a driver that controls the multi function peripheral 1 via the computer network 2, and is a processing unit that generates/parses messages used for the services. Further, the driver 42 obtains a part or all of both the service definition data 15a and the schema data 15b with controlling the communication processing unit 41, and identifies (a) a syntax of messages and (b) permissible values of parameters used in the messages based on it.

Operations of the apparatus 1 and the device 3 are explained next.

In the multi function peripheral 1, after the computer 17 is started, programs are executed by the computer 17, and consequently, the communication processing unit 21, the XML processing unit 22, the control unit 23 and the driver 24 are realized. The XML processing unit 22 reads out the service definition data 15a after it is started, and consequently, realizes the message generating unit 22a and the message parsing unit 22b based on the service definition data 15a. In this time, the XML processing unit 22 also reads out the schema data 15b referenced in the service definition data 15a.

On the other hand, in the terminal device 3, the computer 33 executes the driver program 32a, etc., and consequently, the communication processing unit 41 and the driver 42 are realized.

In the terminal device 3, if a predetermined user operation is detected by an input device such as key board (not shown), then it is determined that a request of a service by a user takes place, and therefore, the driver 42 executes a process to transmit a request message to the multi function peripheral 1.

The driver 42 obtains a part or all of both the service definition data 15a and the schema data 15b in relation to a service requested by a user. Specifically, the driver 42 transmits an HTTP command to a predetermined URL of the multi function peripheral 1 with controlling the communication processing unit 41, and receives a part or all of the service definition data 15a and the schema data 15b in a response from the multi function peripheral 1. For instance, the driver 42 may specify a URL of a data file that includes the service definition data 15a and/or the schema data 15b. Alternatively, the driver 42 may specify a URL of a CGI (Common Gate Interface) that distills and transmits a requested part in the data 15a and 15b as a response. The communication processing unit 21 has an HTTP server function, and receives the HTTP command and transmits a response to the terminal device 3.

The driver 42 identifies (a) a syntax of messages used in the service and (b) permissible values of parameters used in the service, from the obtained part or all of the service definition data 15a and the schema data 15b. The driver 42 of the terminal device 3 identifies the name of a message related to the service that a user requests, and identifies the syntax and the permissible values for messages that have the name from the service definition data 15a and the schema data 15b.

The driver 42 causes a display device (not shown) to display a list of permissible values of a parameter used in the service, and then selects a value of the parameter from the list according to a user operation detected by an input device (not shown), and generates a request message that contains the value.

For instance, in case that a request of an image scanning service takes place, the driver 42 obtains a part or all of the service definition data 15a and the schema data 15b shown in FIGS. 2 and 3, and then determines that the parameter "file_format" (file_format element) and the parameter "file_name" (file_name element) are used in the message "send_request", and also determines that permissible values of the parameter "file_format" are "PDF", "JPEG", and "BMP". The parameter "file_format" specifies a file format of a scanned image. In this case, the driver 42 causes a display device (not shown) to display (a) a list of the permissible values "PDF", "JPEG", and "BMP" of the parameter "file_format" and (b) a text to prompt a user to choose one of the values. For instance, if a user operation to choose "PDF" is detected, the driver 42 sets a value of the parameter "file_format" as "PDF". Moreover, the driver 42 causes a display device (not shown) to display an input field and a prompt text. The input field is to be input a value of the parameter "file_name" that specifies a file name. The prompt text prompts a user to input the value to the input field. For instance, if a user operation to input the text "scan001" is detected, the driver 42 sets a value of the parameter "file_name" as "scan001". The driver 42 generates a request message as shown in FIG. 4 with the selected value of the parameter according to the obtained service definition data 15a and the schema data 15b. This generated message is a SOAP message. It should be noted that FIG. 4 indicates only a SOAP envelope part in the SOAP message.

As mentioned above, the terminal device 3 obtains the service definition data 15a and the schema data 15b from the multi function peripheral 1 that performs a service, and therefore, it is not required that the data 15a and 15b have been stored in the terminal device 3 in advance. For instance, even if different syntaxes are used for respective machine types of the multi function peripheral 1, it is not necessary that the service definition data 15a and the schema data 15b have been stored for the respective machine types, and the data 15a and 15b are maintained only in the multi function peripheral 1.

The driver 42 causes the communication processing unit 41 to transmit the generated request message to the multi function peripheral 1. Specifically, the communication processing unit 41 controls the communicating device 31, and causes the device 31 to transmit the request message to the computer network 2 according to HTTP. The transmitted message is received by the communication processing unit 21 of the multi function peripheral 1 through the communicating device 16 from the computer network 2. The communication processing unit 21 receives the message and transfers the message to the XML processing unit 22.

In the XML processing unit 22, the message parsing unit 22b parses the message according to the service definition data 15a and the schema data 15b to identify a service that uses the message, and notifies the control unit 23 of (a) a request by the message and (b) values of parameters in the message. For instance, upon receiving the message shown in FIG. 4, the message parsing unit 22b determines that the message is a send_request message of an image scanning service, and identifies values of parameters specified in the message. The message parsing unit 22b notifies the control unit 23 of (a) the values of the parameters in the message and (b) receiving the send_request message of an image scanning service.

Upon receiving the notification, the control unit 23 controls the internal devices and causes the internal devices to perform the requested service. For instance, upon receiving the notification of (a) values of parameters specified in the message and (b) receiving a send_request message of an image scanning service, the control unit 23 controls the image scanning device 13 and causes the image scanning device 13 to scan an image of a document. The image scanning device 13 generates a file with a file name in a file format. The file includes data of the scanned image, and the file name and the file format are specified with the parameters.

Upon detecting that the internal device finishes performing the service, the control unit 23 notifies the message generating unit 22a of a result of the service.

The message generating unit 22a receives the notification of the result of the service, and then generates a response message according to the service definition data 15a and the schema data 15b.

For instance, the message generating unit 22a receives, as a notification of the result of the image scanning service, a transmission request of a send_response message (i.e. a response message) of the image scanning service defined in the service definition data 15a shown FIG. 2. Upon receiving it, the message generating unit 22a identifies syntax of the response with the service definition data 15a and the schema data 15b shown in FIGS. 2 and 3, and also identifies permissible values of the parameter "result" (result element) in the message. Based on the service definition data 15a and the schema data 15*b* shown in FIGS. 2 and 3, it is determined that (a) a result element exists in the send_response message, (b) permissible values of the result element are "SUCCESS", "JOB_CANCELED_ERROR", and "INTERNAL_ERROR", etc. The message generating unit 22*a* selects a value of the result element from "SUCCESS", "JOB_CANCELED_ERROR", and "INTERNAL_ERROR" corresponding to the notification from the control unit 23, and generates a SOAP message that contains the result element with the value. For instance, in case that the control unit 23 notifies the message generating unit 22*a* of finishing the requested image scanning service successfully, the message generating unit 22*a* generates a SOAP message as shown in FIG. 5. It should be noted that FIG. 5 indicates only a SOAP envelope part in the SOAP message.

The XML processing unit 22 causes the communication processing unit 21 to transmit the generated response message to the terminal device 3. The communication processing unit 21 controls the communicating device 16, and causes the device 16 to transmit the message to the computer network 2 according to HTTP. The transmitted message is received by the communication processing unit 41 of the terminal device 3 through the communicating device 31 from the computer network 2. The communication processing unit 41 receives the message and transfers the message to the driver 42. The driver 42 detects the result of the requested service in the response message. The driver 42 executes a process corresponding to the result. For instance, the driver 42 causes a display device (not shown) to display the result of the service. Further, for instance, in case of an image scanning service, in the multi function peripheral 1, an image data file that has been encoded to text data may be inserted into the response message, and the driver 42 may obtain the original image data file with decoding the text data in the message.

As mentioned above, a request and a response are transmitted and received in relation to a service. In case that a request of a service takes place due to a user operation to the operation panel 11, as well as the driver 42, the driver 24 can communicate with the XML processing unit 22 to transmit/receive a request message and a response message, so that executed is the process as same as the aforementioned one.

FIG. 6 shows a diagram that indicates a layer structure of message communication process in Embodiment 1 of the present invention. As shown in FIG. 6, in this system, (a) a program interface part of message transmission and message receipt, and (b) an implementation part of message communication are defined separately. Even if the implementation part (i.e. a part defined in the aforementioned binding element) is changed, it is not necessary to change the program interface part (i.e. a part defined in the aforementioned message element), the drivers 24, 42, and the control unit 23 used to perform a service. Further, only editing text data i.e. the service definition data 15*a* and/or the schema data 15*b* can change the implementation part of message communication. Therefore, significant changes in the apparatus 1 and the device 3 are not required to change a specification of messages used for services.

Embodiment 2

Figure 7:
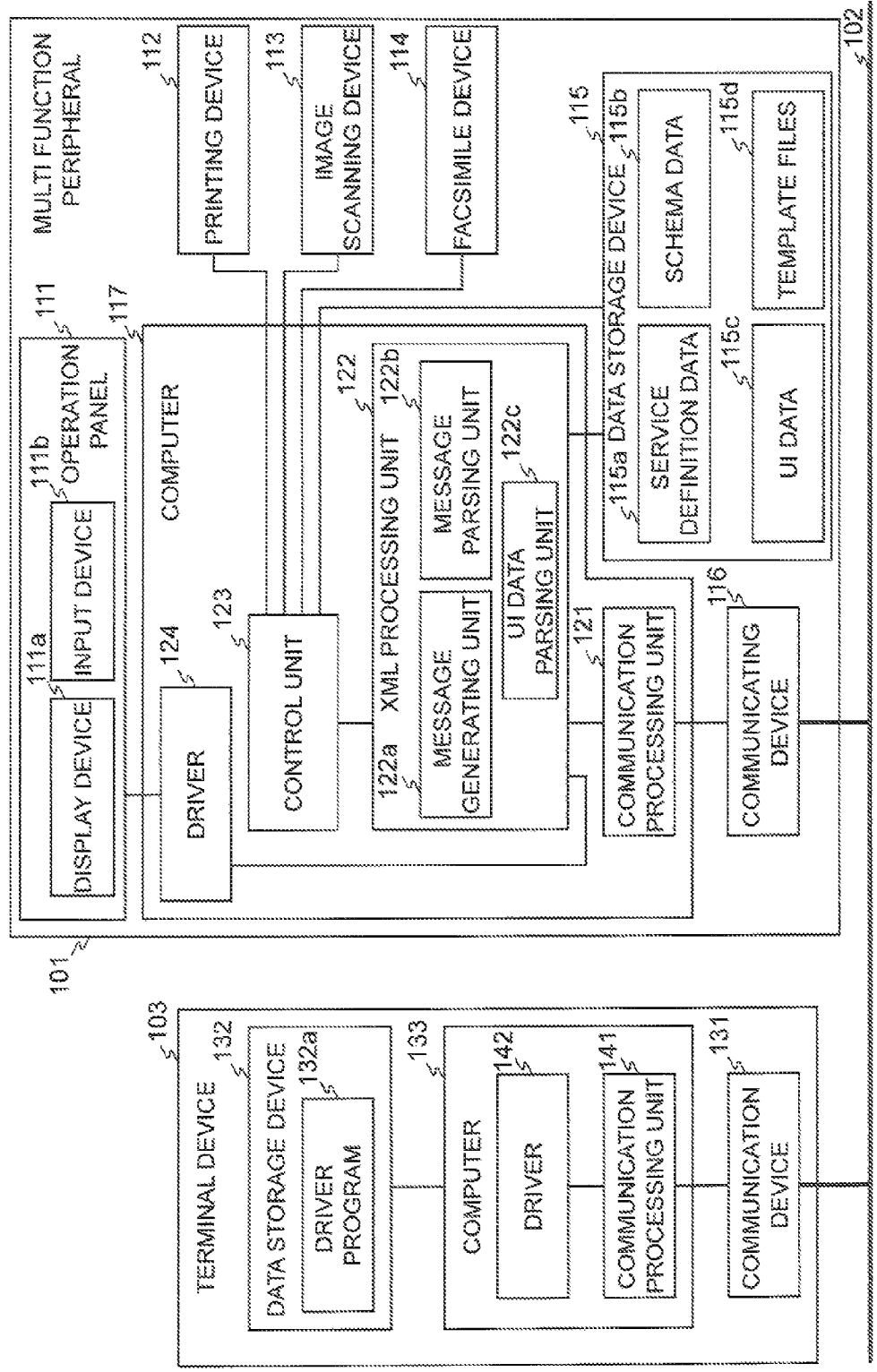
FIG. 7 shows a block diagram that indicates an image forming system including a multi function peripheral as an image forming apparatus according to Embodiment 2 of the present invention.

FIG. 7 shows a block diagram that indicates an image forming system including a multi function peripheral as an image forming apparatus according to Embodiment 2 of the present invention. In the system, a multi function peripheral 101 is connected to a computer network 102, and is used by either a terminal device 103 connected to the computer network 102 or a user who operates an operation panel 111 of the multi function peripheral 101. A user operation takes place to request to perform a service, and then a request message and a response message are transmitted either inside the multi function peripheral 101 or between the multi function peripheral 101 and the terminal device 103.

In FIG. 7, the multi function peripheral 101 has the operation panel 111, a printing device 112, an image scanning device 113, a facsimile device 114, a data storage device 115, a communicating device 116, and a computer 117.

The operation panel 111 is a user interface device that contains (a) a display device 111*a* such as liquid crystal display, and (b) an input device 111*b* that detects a physical user operation electronically. The input device 111*b* may be key switches, a transparent touch panel placed on a screen of the display device, etc.

The printing device 112 is an internal device that prints a document image based on document data generated by the image scanning device 113, document data stored in a document box (not shown), document data received from the terminal device 103, or the like. The document data is image data in a predetermined format.

The image scanning device 113 is an internal device that scans an image of a document and outputs document data of the image. To scan the image of the document fed by an auto document feeder or put by a user, the image scanning device 113 radiates light to a single side or both sides of the document, and detects reflection light or the like from the document.

The facsimile device 114 is an internal device that has a modem, and transmits and receives facsimile signals. The facsimile device 114 generates a facsimile signal from document data generated by the image scanning device 113 or stored in the document box, and generates document data from a received facsimile signal.

The data storage device 115 is a device that stores service definition data 115*a*, schema data 115*b*, user interface data 115*c*, template files 115*d*, programs (not shown) to be executed by the computer 117, document data, etc. The data storage device 115 may be a device that drives readable/writable recording medium such as hard disk drive and/or non-volatile memory.

The service definition data 115*a* is text data that contains (a) syntax definitions of an interface part of a service, and (b) designation of protocol of messages to be used in the service. In the interface part, at least a call and a return value of the service are defined. The service definition data 115*a* is described in XML, for example. In addition, the service definition data 115*a* is described in WSDL, for example. It should be noted that the service definition data 115*a* is data that contains syntax definitions, and is not transmitted as a message. The service definition data 115*a* can be stored as either one file or a plurality of files. In the service definition data 115*a*, a schema language is used to describe the syntax definitions. In this embodiment, XML Schema is used to describe the syntax definitions in the service definition data 115*a*. The syntax definitions may be described in the service definition data 115*a* in XML Schema. Alternatively, a reference to external schema data 115*b* may be described in the service definition data 115*a* to read and use the schema data 115*b*.

The schema data 115*b* is external schema data referenced in the service definition data 115*a*. The schema data 115*b* is text data described in a predetermined language. The schema data 115*b* can be stored as either one file or a plurality of files.

FIG. 8 shows a diagram that indicates an instance of the service definition data 115*a* described in WSDL. FIG. 9 shows a diagram that indicates an instance of the schema data 115*b* referenced in the service definition data 15*a*.

The service definition data 115a shown in FIG. 8 contains syntax definitions of an editing service for the user interface data 115c. In the editing service, it is possible to change, add or delete a component of a user interface screen in the user interface data 115c. The service definition data 115a shown in FIG. 8 consists of a definition element of WSDL. A types element of WSDL is in the definition element, and an include element in the types element references the external schema data 115b, for instance, "panel.xsd" shown in FIG. 9. A message element and a portType element of WSDL are in the definitions element, and in the message element and the portType element, syntax definitions of both a request message and a response message are described as an interface part of the service. In the portType element, operation elements are described. The operation element indicates respective operations that can be requested to the multi function peripheral 101. As shown FIG. 8, an operation element to add a button to a user interface screen is described, and in the operation element, "button_request" is defined as a request message, and "button_response" is defined as a response message. Also described are an operation element to delete a button in a user interface screen, an operation element to update attribution information on a button in a user interface screen, etc. Moreover, an operation element is contained for adding, deleting and updating another component (e.g. list box, text box, etc.) in a user interface screen.

A binding element of WSDL is in the definitions element, and in the binding element, a protocol of messages used for the service is designated. In the binding element shown in FIG. 8, SOAP is designated as the protocol used for the messages.

In the schema data 115b shown in FIG. 9, described are (a) syntax definitions of a request message (button_request), (b) syntax definitions (not shown) of a response message, and (c) definitions (not shown) of permissible values of parameters used in the messages. The syntax definitions of the messages are described as one or more element elements and one or more complexType elements of XML Schema (xsd). A definition of the permissible values is described as a simpleType element of XML Schema (xsd). In this embodiment, the schema data 115b also contains syntax definitions of describing attribution information on components of a user interface screen in the user interface data 115c. These syntax definitions are also used to describe the attribution information on components of a user interface screen in a message. The syntax definitions include (a) attribution items of the components and/or (b) available setting values (i.e. permissible values) of the attribution items.

As mentioned above, the service definition data 115a has been stored in advance for each of services. In addition, the external schema data 115b has been stored in advance if required.

Figure 10:
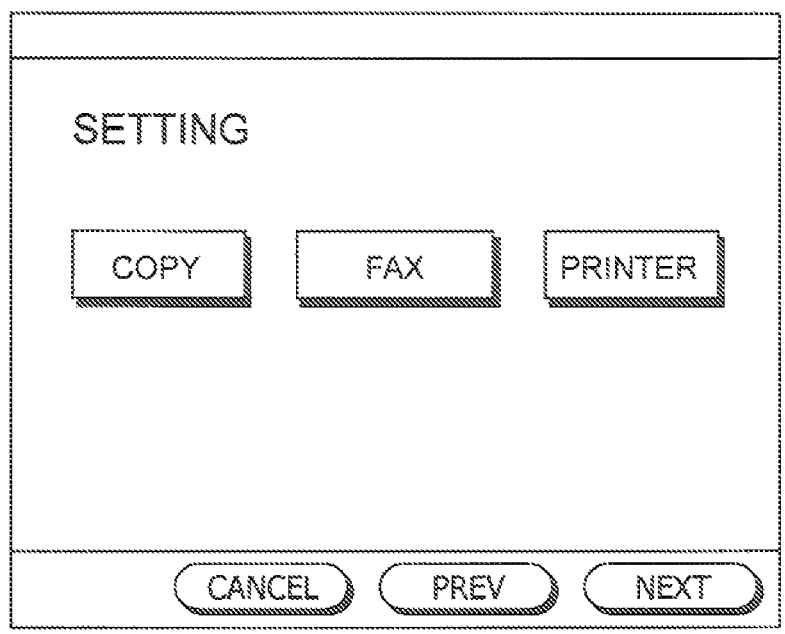
FIG. 10 shows a diagram that indicates an instance of a user interface screen.

The user interface data 115c is text data that contains attribution information on components in a user interface screen displayed by the display device 111a of the operation panel 111. In case that user interface screens are used, different pieces of attribution information are described on components in the respective user interface screens. The user interface data 115c is described in XML according to the syntax definitions in the schema data 115b. FIG. 10 shows a diagram that indicates an instance of a user interface screen. The user interface screen shown in FIG. 10 contains the components: "SETTING" text, "COPY" button, "FACSIMILE" button, and "PRINTER" button. FIG. 11 shows a diagram that indicates the user interface data 115c in which a user interface screen shown in FIG. 10 is described. As shown in FIG. 11, a user interface screen is described as a screen element, and the screen element has child elements: (a) a screen_name element that contains the name of the user interface screen, (b) a screen_title element that contains attribution information on the "SETTING" text, and (c) three button elements that contain pieces of attribution information on the "COPY" button, the "FACSIMILE" button, and the "PRINTER" button. The button element has child elements: (a) an event_button element that contains attribution information on displaying the button, and (b) a procedure_string element that specifies an action to be performed when the button is operated. The event_button element contains (a) a button_name element that contains identification information (a button name), (b) a button_string element that contains a button name to be displayed, (c) a button_top element that contains a coordinate value of the top of a button in vertical direction, (d) a button_left element that contains a coordinate value of the left edge of a button in horizontal direction, (e) a button_height element that contains a value of button height, and (f) a button_width element that contains a value of button width.

Figure 12:
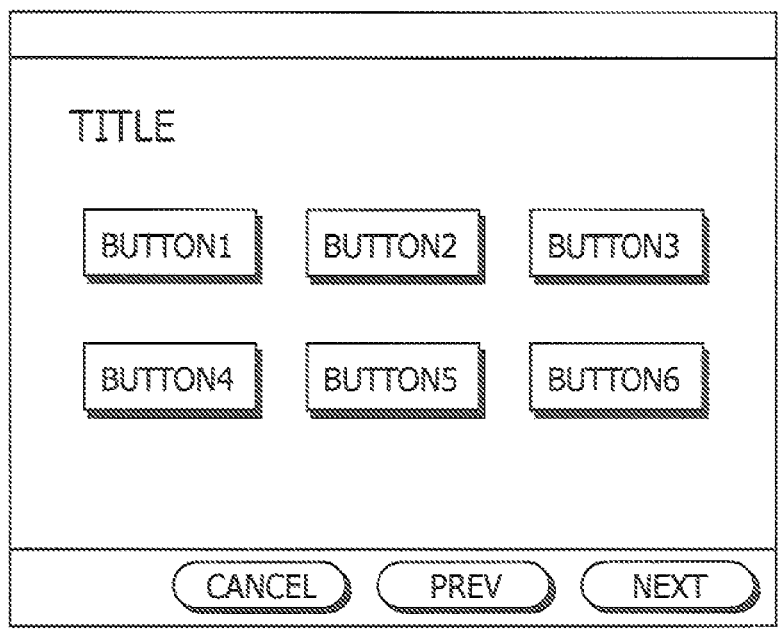
FIG. 12 shows a diagram that indicates a default screen displayed based on a template file.
Figure 13:
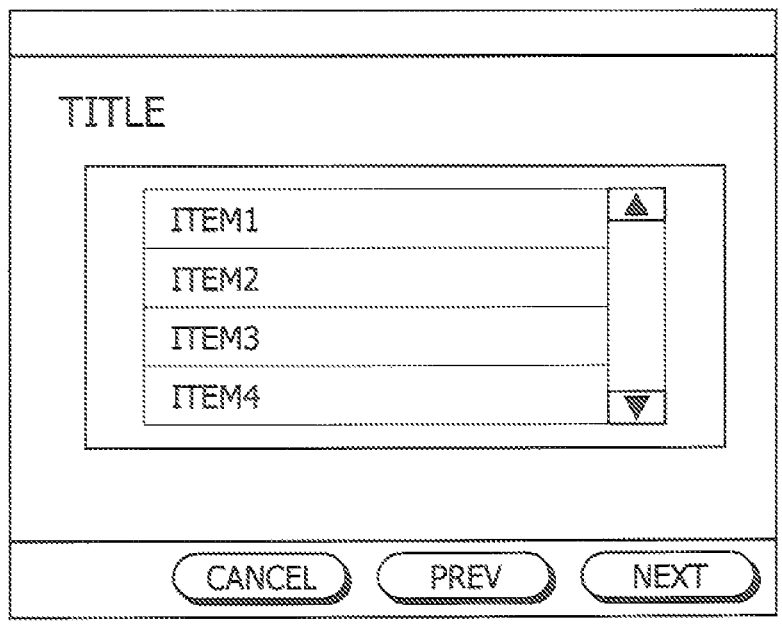
FIG. 13 shows a diagram that indicates a default screen displayed based on a template file.
Figure 14:
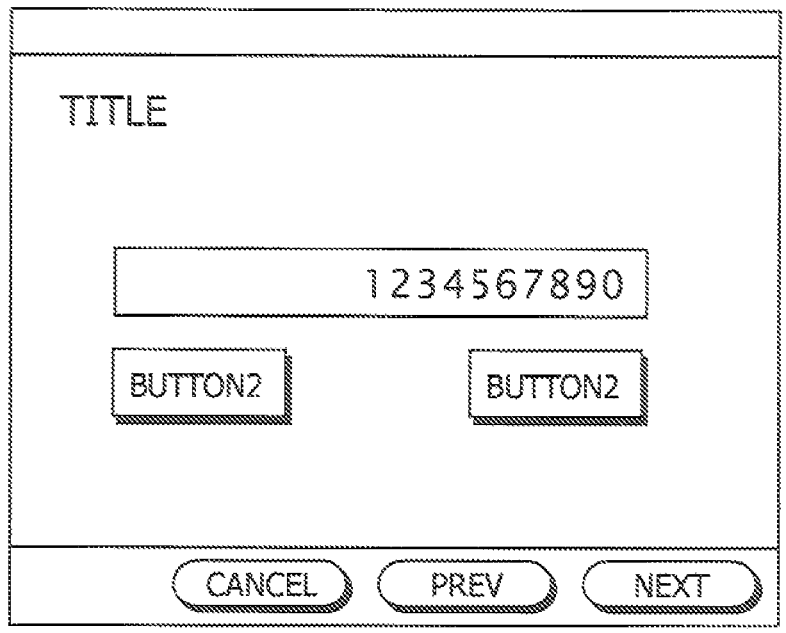
FIG. 14 shows a diagram that indicates a default screen displayed based on a template file.
Figure 15:
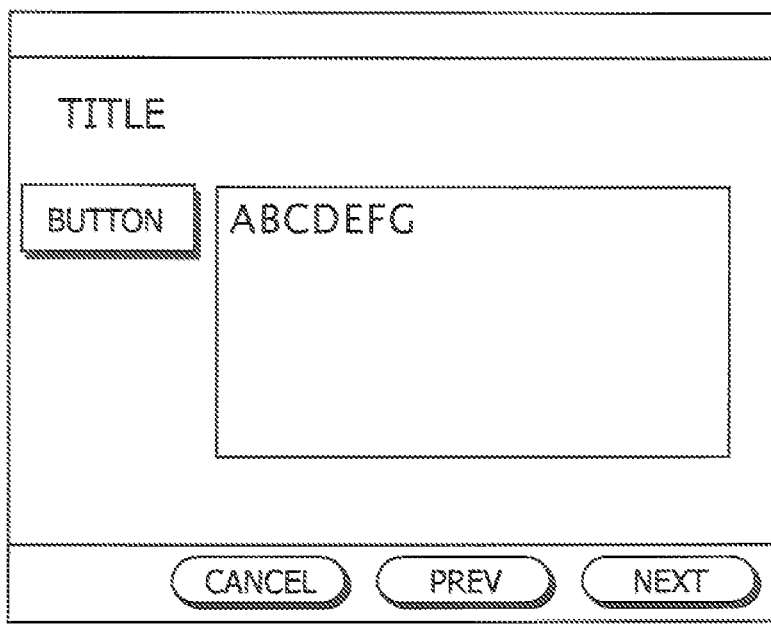
FIG. 15 shows a diagram that indicates a default screen displayed based on a template file.

The template files 115d are default data in which components of user interface screens are described in XML. The template files 115d are also described according to the syntax definition in the schema data 115b. Each of the template files 115d contains attribution information on one or more components in one of the user interface screen together with one or more default values of the attribution. It is possible to use an XML text in the template files 115d for customizing the user interface data 115c. FIGS. 12 to 16 show diagrams that indicate default screens displayed based on the template files 115d. FIG. 12 shows a button-selection-type screen that contains the components of one or more buttons and one or more texts. FIG. 13 shows a list-type screen that contains a list of the components. FIG. 14 shows a numerical-input-type screen that contains an input field as the component. FIG. 15 shows a text-input-type screen that contains a text input field as the component. FIG. 16 shows a number-selecting-type screen that contains a numeric increment button, a numeric decrement button and a numerical value field as the components.

The communicating device 116 is connected to the computer network 102, and is a device capable of communicating with another device (e.g. the terminal device 103) connected to the computer network 102. The communicating device 116 may be a network interface card, or the like.

The computer 117 has a CPU (Central Processing Unit), a RAM (Random Access Memory), a ROM (Read Only Memory) and other components, and is a device that loads a program to the RAM and executes the program with the CPU in order to realize processing units. The computer 117 realizes a communication processing unit 121, an XML processing unit 122, a control unit 123, and a driver 124 based on a program (not shown).

The communication processing unit 121 is a processing unit that controls the communicating device 116, and transmits/receives messages via the computer network 102 according to predetermined communication protocols. In this embodiment, since SOAP (Simple Object Access Protocol) is used as a message protocol, TCP/IP (Transmission Control Protocol/Internet Protocol) and HTTP (Hypertext Transfer Protocol) are used as communication protocols.

The XML processing unit 122 reads out the service definition data 115a described in WSDL and realizes a message generating unit 122a and a message parsing unit 122b based on the service definition data 115a. The message generating unit 122a generates messages according to syntax definitions described in the service definition data 115a. The messages are a response message that indicates a result of a service, a notification message, etc. The message parsing unit 122*b* parses messages according to syntax definitions described in the service definition data 115*a*. The messages are a request message that indicates a request of a service, etc. The message parsing unit 122*b* identifies a request described in the message based on a result of parsing the message. The UI data parsing unit 122*c* identifies attributions of the components with parsing the user interface data 115*c*, and causes the display device 111*a* to display the user interface screen that reflects the attributions of the components. The UI data parsing unit 122*c* causes the driver 124 to display the user interface screen based on a result of parsing the data 115*c*.

The control unit 123 is a processing unit that controls internal devices to cause them to perform services according to a request identified by the XML processing unit 122, and obtains results of the services from the internal devices to provide the results to the XML processing unit 122. The internal devices such as the printing device 112, the image scanning device 113, and the facsimile device 114 have functions capable of performing the services.

The driver 124 is a driver of the operation panel 111, and is a processing unit that communicates with the XML processing unit 122 to transmit/receive messages in relation to information on a user operation input to the operation panel 111 and information on a user interface screen to be displayed on the operation panel 111.

In FIG. 7, the terminal device 103 has a communicating device 131, a data storage device 132, and a computer 133. The terminal device 103 may be a personal computer, or the like.

The communicating device 131 is connected to the computer network 102, and is a device capable of communicating with another device (e.g. the multi function peripheral 101) connected to the computer network 102. The communication device 131 may be a network interface card, or the like.

The data storage device 132 is a device that stores programs to be executed by the computer 133, etc. In the data storage device 132, a driver program 132*a* has been stored. The data storage device 132 may be a device that drives a readable/writable recording medium such as hard disk drive and/or non-volatile memory.

The computer 133 has a CPU, a RAM, a ROM and other components, and is a device that loads a program to the RAM and executes the program with the CPU in order to realize processing units. The computer 132 realizes a communication processing unit 141 and a driver 142 based on the driver program 133*a*, etc.

The communication processing unit 141 is a processing unit that controls the communicating device 131, and transmits/receives messages via the computer network 102 according to predetermined communication protocols. In this embodiment, since SOAP messages are used as the messages, TCP/IP and HTTP are used as communication protocols. For instance, the communication processing unit 141 transmits a request message to edit the user interface data 115*c*.

The driver 142 is a driver that controls the multi function peripheral 101 via the computer network 102, and is a processing unit that generates/parses messages used for the services. Further, the driver 142 obtains a part or all of both the service definition data 115*a* and the schema data 115*b* with controlling the communication processing unit 141, and identifies (a) a syntax of messages, (b) attribution items used in the messages, and (c) permissible values to be set to the attribution items.

Displaying a user interface screen in the multi function peripheral 101 is explained next.

In the multi function peripheral 101, after the computer 117 is started, programs are executed by the computer 117, and consequently, the communication processing unit 121, the XML processing unit 122, the control unit 123 and the driver 124 are realized.

After the computer 117 is started, the UI data parsing unit 122*c* reads out an XML text of a predetermined initial screen from the user interface data 115*c*, parses the XML text, and provides an instruction to the driver 124 according to a result of parsing the XML text. The driver 124 causes the display unit 111*a* to display the initial screen according to the instruction.

If the input device 111*b* detects a user operation while the initial screen is displayed, then information on the user operation is supplied to the XML processing unit 122 through the driver 124. The UI data parsing unit 122*c* takes the user operation into account, and if the UI data parsing unit 122*c* determines that a screen transition is necessary, the UI data parsing unit 122*c* reads out an XML text of a next screen from the user interface data 115*c*, parses the XML text, and provides an instruction to the driver 124 according to a result of parsing the XML text. The driver 124 makes a screen transition and causes the display unit 111*a* to display the next screen according to the instruction.

Afterward, a screen transition is also made every time when it becomes necessary due to a user operation or a state transition of the multi function peripheral 101.

In the following part, customizing a user interface screen in the multi function peripheral 101 is explained. A user or a serviceperson operates the terminal device 103 for the customization.

The XML processing unit 122 reads out the service definition data 115*a* after it is started, and consequently, realizes the message generating unit 122*a* and the message parsing unit 122*b* based on the service definition data 115*a*. In this time, the XML processing unit 122 also reads out the schema data 115*b* referenced in the service definition data 115*a*.

On the other hand, in the terminal device 103, the computer 133 executes the driver program 132*a*, etc., and consequently, the communication processing unit 141 and the driver 142 are realized.

In the terminal device 103, if a predetermined user operation is detected by an input device such as key board (not shown), then it is determined that a request of a service by a user takes place, and therefore, the driver 142 executes a process to transmit a request message to the multi function peripheral 101.

The driver 142 obtains a part or all of the service definition data 115*a* and the schema data 115*b* in relation to a service requested by a user. Specifically, the driver 142 transmits an HTTP command to a predetermined URL of the multi function peripheral 101 with controlling the communication processing unit 141, and receives a part or all of the service definition data 115*a* and the schema data 115*b* in a response from the multi function peripheral 101. For instance, the driver 142 may specify a URL of a data file that includes the service definition data 115*a* and/or the schema data 115*b*. Alternatively, the driver 142 may specify a URL of a CGI (Common Gate Interface) that distills and transmits a requested part in the data 115*a* and 115*b* as a response. The communication processing unit 121 has an HTTP server function, and receives the HTTP command and transmits a response to the terminal device 103.

The driver 142 identifies (a) a syntax of messages used in the service and (b) permissible values of parameters used in the service, from the obtained part or all of the service definition data 115*a* and the schema data 115*b*. The driver 142 of the terminal device 103 identifies the name of a message related to the service that a user requests, and identifies the syntax and the permissible values for messages with the name from the service definition data 115a and the schema data 115b.

The driver 142 causes a display device (not shown) to display a list of permissible values of a parameter used in the service, and then selects a value of the parameter from the list according to a user operation detected by an input device (not shown), and generates a request message that contains the value.

For instance, in case that a request of a user interface screen editing service to add a button takes place, the driver 142 obtains a part or all of the service definition data 115a and the schema data 115b shown in FIGS. 8 and 9, and identifies parameters and attribution items with the obtained data. The driver 142 determines that the parameters "screen_name" (screen_name element), "event_button" (event_button element) and "procedure_string" (procedure_string element) are used in a "send_request" message, and also determines that the attribution items in the parameter "event_button" are "button_name", "button_string", "button_top", "button_left", "button_height", and "button_width". The driver 142 causes a display device (not shown) to display a screen that prompts the user or the serviceperson to input values of the parameters and the attribution items. If text input of the parameters and the attribution items is detected by an input device (not shown), the driver 142 generates a request message as shown in FIG. 17 with the selected value of the parameter according to the obtained service definition data 115a and the schema data 115b. This generated message is a SOAP message. It should be noted that FIG. 17 indicates only a SOAP envelope part in the SOAP message.

As mentioned above, the terminal device 103 obtains the service definition data 115a and the schema data 115b from the multi function peripheral 101 that performs a service, and therefore, it is not required that the data 115a and 115b have been stored in the terminal device 103 in advance. For instance, even if different syntaxes are used for respective machine types of the multi function peripheral 101, it is not necessary that the service definition data 115a and the schema data 115b have been stored for the respective machine types, and the data 115a and 115b are maintained only in the multi function peripheral 101.

The driver 142 causes the communication processing unit 141 to transmit the generated request message to the multi function peripheral 101. Specifically, the communication processing unit 141 controls the communicating device 131, and causes the device 131 to transmit the request message to the computer network 102 according to HTTP. The transmitted message is received by the communication processing unit 121 of the multi function peripheral 101 through the communicating device 116 from the computer network 102. The communication processing unit 121 receives the message and provides the message to the XML processing unit 122.

In the XML processing unit 122, the message parsing unit 122b parses the message according to the service definition data 115a and the schema data 115b to identify a service that uses the message, and notifies the control unit 123 of (a) a request by the message and (b) values of parameters in the message. For instance, upon receiving the message shown in FIG. 17, the message parsing unit 122b determines that the message is a send_request message of a user interface screen editing service, and identifies values of parameters specified in the message. The message parsing unit 122b notifies the control unit 123 of (a) the values of the parameters in the message and (b) receiving the send_request message of a user interface screen editing service.

Upon receiving the notification, the control unit 123 controls the internal devices and causes the internal devices to perform the requested service. For instance, upon receiving the notification of (a) values of parameters specified in the message and (b) receiving a send_request message of a user interface screen editing service, the control unit 123 edits the user interface data 115c stored in the data storage device 115. Specifically, in case of adding or updating a component, the control unit 123 writes the component (i.e. XML element) described in the received request message into the user interface data 115c without any modifications of the XML element. For instance, an event_button element and a procedure_string element described in FIG. 17 are added to the user interface data 115c without any editing and any conversion of the elements.

If the control unit 123 finishes performing the service, the control unit 123 notifies the message generating unit 122a of a result of the service.

The message generating unit 122a receives the notification of the result of the service, and then generates a response message according to the service definition data 115a and the schema data 115b.

For instance, the message generating unit 122a receives, as a notification of the result of the user interface screen editing service, a transmission request of a send_response message (i.e. a response message) of the service in the service definition data 115a. Upon receiving it, the message generating unit 122a identifies syntax of the response SOAP message from the service definition data 115a and the schema data 115b, and generates the response SOAP message. For instance, in case that the control unit 123 notifies the message generating unit 122a of finishing the requested user interface screen editing service successfully, the message generating unit 122a generates a SOAP message as shown in FIG. 18. It should be noted that FIG. 18 indicates only a SOAP envelope part in the SOAP message.

The XML processing unit 122 causes the communication processing unit 121 to transmit the generated response message to the terminal device 103. The communication processing unit 121 controls the communicating device 116, and causes the device 116 to transmit the message to the computer network 102 according to HTTP. The transmitted message is received by the communication processing unit 141 of the terminal device 103 through the communicating device 131 from the computer network 102. The communication processing unit 141 receives the message and provides the message to the driver 142. The driver 142 detects the result of the requested service in the response message. The driver 142 executes a process corresponding to the result. For instance, the driver 142 causes a display device (not shown) to display the result of the service. Further, for instance, in case of the user interface screen editing service, in the multi function peripheral 101, the user interface data 115c of the edited user interface screen may be inserted into the response message, and the driver 142 of the terminal device 103 causes to display the edited user interface screen based on the user interface data 115c in the message.

Further, in the user interface screen editing service, a user interface screen may be added or updated with the template files 115d. In this case, for instance, the terminal device 103 transmits a request message to the multi function peripheral 101. The request message specifies a user interface screen and one of the template files 115d. In the multi function peripheral 101, the user interface data 115 of the specified user interface screen is updated with the specified template file, or data in the specified template file is added to the user interface data 115 as data of the specified user interface screen. Syntax definitions of this request message are also in the service definition data 115*a* and the schema data 115*b*. Afterward, it is possible to edit components in the user interface screen that generated from the template file.

As mentioned above, according to Embodiment 2, the multi function peripheral 101 contains the display device 111*a* that displays a user interface screen; the data storage device 115 that stores the user interface data 115*c* containing attributions of components in the user interface screen; and the UI data parsing unit 122*c* that identifies attributions of the components with parsing the user interface data, and causes the display device 111*a* to display the user interface screen that reflects the attributions of the components. The user interface data is described as text data.

Therefore, it is possible to customize a user interface by editing user interface data 115*c* in a text format. Consequently, it is possible to customize a user interface screen of the multi function peripheral 101 easily.

Further, according to Embodiment 2, the multi function peripheral 101 contains: the XML processing unit 122 that parses a message according to the service definition data 115*a*; and the control unit 123 that executes the editing service according to a request obtained from a result of parsing the message by the XML processing unit 122. The service definition data 115*a* includes syntax definitions of an interface part of an editing service of the user interface data 115*c* and designation of a protocol to be used for the service.

Therefore, the multi function peripheral 101 performs editing the user interface data 115*c* as a service, and consequently, it is possible to edit the user interface data 115*c* by transmitting a message from an external device to the multi function peripheral 101 without operating the multi function peripheral 101 directly. Consequently, it is possible to customize a user interface screen of the multi function peripheral 101 easily.

Further, according to Embodiment 2, in the multi function peripheral 101, the user interface data 115*c* and the message are described in XML, and the control unit 123 updates the user interface data 115*c* with an XML text of the attributions of the components distilled by the message processing unit 122*b*.

Therefore, conversion from a message to an XML text for the user interface data 115*c* is not necessary when the user interface data 115*c* is updated.

Further, according to Embodiment 2, in the terminal device 103, the driver 142 obtains a part or all of the schema data 115*b* from the multi function peripheral 101 and identifies one or more items in the attributions of the components with the part or all of the schema data 115*b*.

Therefore, it is possible to customize the image forming apparatus without storing items of the components in the terminal device 103 in advance.

Further, according to Embodiment 2, in the terminal device 103, the driver 142 obtains a part or all of the schema data 115*b* from the multi function peripheral 101 and identifies one or more permissible values on the attributions of the components with the part or all of the schema data 115*b*. The communication processing unit 141 transmits the message to set a value selected from the one or more permissible values to one of the attributions.

Therefore, it is possible to customize the image forming apparatus without storing items of the components in the terminal device 103 in advance.

Further, according to Embodiment 2, the user interface data 115*c* and the message are described in XML, the schema data 115*b* is XML data described in XML Schema, and the control unit 123 updates the user interface data 115*c* with an XML text of the attributions of the components distilled by the XML processing unit 122.

Therefore, it is possible to customize the image forming apparatus without storing syntax definitions in the terminal device 103 in advance.

Further, according to Embodiment 2, the data storage device 115 stores the template files 115*d* containing respective default data of the user interface screen. The communication processing unit 141 of the terminal device 103 selects one of the template files 115*d* and transmits the message to set default data in the selected template file as data of one of user interface screens in the user interface data 115*c*.

Therefore, it is possible to execute complex customization easily with using the templates.

Embodiment 3

As well as Embodiment 2, in Embodiment 3, buttons are displayed in an operation panel of an image forming apparatus, and attribution information on the buttons is described in a text format. In terms of a simple text language processing program, the attribution information in a text format is parsed, the buttons are displayed according to the attribution information, and a process specified by the attribution information is executed when the buttons are operated.

FIG. 26 shows a schematic diagram that indicates a hardware configuration in the image forming apparatus 210 of Embodiment 3.

In the image forming apparatus 210, an MPU 211 is connected via interfaces 212 to a PROM 213, a DRAM 214, an operation panel 215, a printer 216, a scanner 217, a NIC 218, a FAX modem 219, a USB port 220, a toner remaining amount detector 221, an IC card reader 222, an electronic tag reader 223, and a timer TM. In FIG. 26, for simplicity, the interfaces are depicted as one block.

The PROM 213 is, for example, a flash memory. In the PROM 213, an operating system (OS), programs to be executed in an upper layer of the OS, and setting values have been stored. The programs realize functions of a multi function peripheral in the image forming apparatus 210. The functions include copying, scanning, printing, facsimile transmission/reception, email transmission/reception, and HTTP communication. The DRAM 214 is a memory for a work area.

The operation panel 215 has a display unit and a key input unit, detects input of setting information or instruction, and displays a screen such as selection screen or setting screen. The printer 216 has a print engine, a fuser, a paper feeding part, a paper transporting part, and a paper outputting part. The printer 216 forms an electrostatic latent image on a photoconductor drum in the print engine with bitmap data supplied as print data, develops it with toner, transfers the toner image onto a sheet, fixes the toner image, and outputs the sheet. The scanner 217 is a device to input an image for copying and facsimile transmission. The network interface card (NIC) 218 is connected to a host computer and a server on a network, and is used for a print job and ordering consumable goods. The FAX modem 219 is a communicating device for facsimile transmission/reception.

The toner remaining amount detector 221 detects a remaining amount of toner in a toner cartridge for the printer 216, and outputs a signal that indicates the remaining amount of toner. The IC card reader 222 wirelessly communicates with an IC card placed within a communicable area to transmit/receive signals, reads out a user ID and a password from the IC card, and outputs them to the image forming apparatus 210 as authentication information. The electronic tag reader 223 reads out a toner cartridge ID from an electronic tag fixed in the toner cartridge, and outputs the ID. This ID contains the type and the serial number of the toner cartridge.

Outputs of the toner remaining amount detector 221 and the electronic tag reader 223 are detected by the MPU 211 according to a program both periodically and when the toner cartridge is mounted. The outputs are stored in the DRAM 214 as Toner.Level and Toner.RFID.

A USB memory 224A connected to the port 220 has, for example, a flash memory chip.

A NIC of the host computer 225 is connected to the NIC 218 via a hub, and to the Internet 226 via a router (not shown). A web server machine 227 is connected to the Internet 226 via a router (not shown). A FAX modem of the web server machine 227 is connected to the FAX modem 219 of the image forming apparatus 210 via a public switched telephone network 228.

The timer TM is used for detecting current time and for timer interruptions to the MPU 211.

Figure 25:
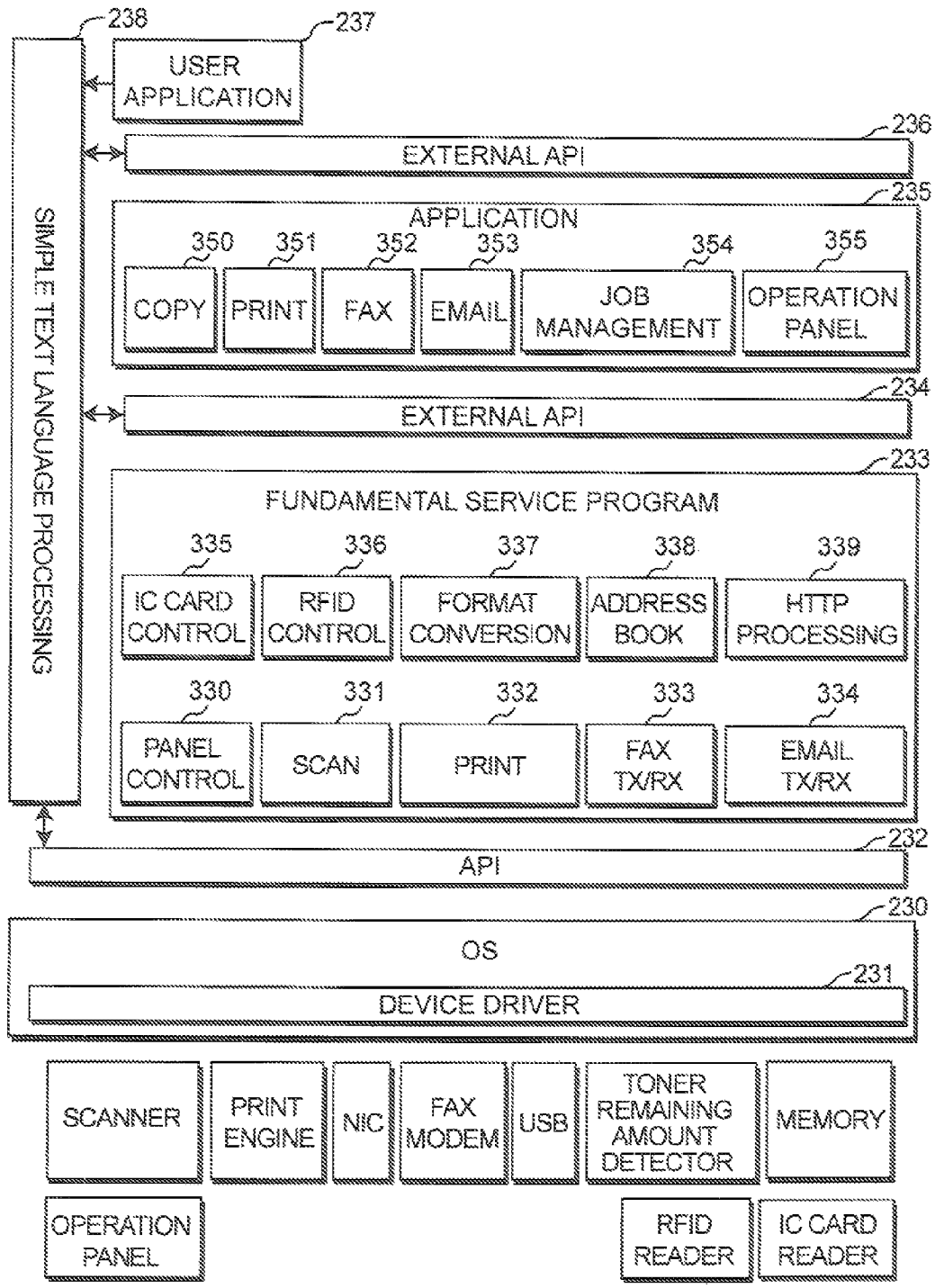
FIG. 25 shows a schematic diagram that indicates a layer structure of software in the image forming apparatus of Embodiment 3.

FIG. 25 shows a schematic diagram that indicates a layer structure of software in the image forming apparatus of Embodiment 3.

An OS 230 contains a kernel (e.g. Linux), device drivers 231 of respective pieces of hardware.

A fundamental service program 233 is in an upper layer than the OS 230. The fundamental service program 233 is middleware that uses functions of the OS 230 through an API 232. The fundamental service program 233 has an operation panel control module 330, a scan module 331 as an image input module, a data processing module that processes input data, a print module 332 as an image output module that outputs processed image data, and an input/output module.

The operation panel control module 330 causes the operation panel 215 to display buttons to be pushed down. The input/output module contains a FAX transmission/reception module 333, an email transmission/reception module 334, and an HTTP processing module 339. The data processing module contains an IC card control module 335, an RFID control module 336, a format conversion module 337, an aggregate processing module (not shown), a page numbering module (not shown), etc. The format conversion module 337 converts a format of image data. The fundamental service program 233 further contains an address book module 338 as a utility module. The address book module 338 is used to specify addresses of facsimile and email.

An external API 234 and an application 235 are in an upper layer than the fundamental service program 233. The application 235 is a program capable of using modules in the fundamental service program 233 through the external API 234. The application 235 contains a copy module 350, a print module 351, a FAX module 352, an email module 353, a job management module 354, and an operation panel module 355. For example, the copy module 350 is composed from the combination of the scan module 331 and the print module 332. For example, the FAX module 352 is composed from the combination of the FAX transmission/reception module 333 and the address book module 338.

Software of the image forming apparatus 210 contains a simple text language processing program 238. The simple text language processing program 238 is an interpreter for a user application 237. The language processing program 238 interprets a statement to the user application 237, and causes the user application 237 to run with calling a function in the fundamental service program 233, the application 235 or the OS 230 through the external API 234, the external API 236 or the API 232.

The user application 237 is generated through a grammatical check and copied into the USB memory 224A, for example, in the host computer 225, and is read from the USB memory 224A to the DRAM 214 via the port 220. Line numbers are attached to respective lines in the user application 237 in a preprocess. FIGS. 23A to 23C indicate specific instances of the user application 237.

Figure 21A:
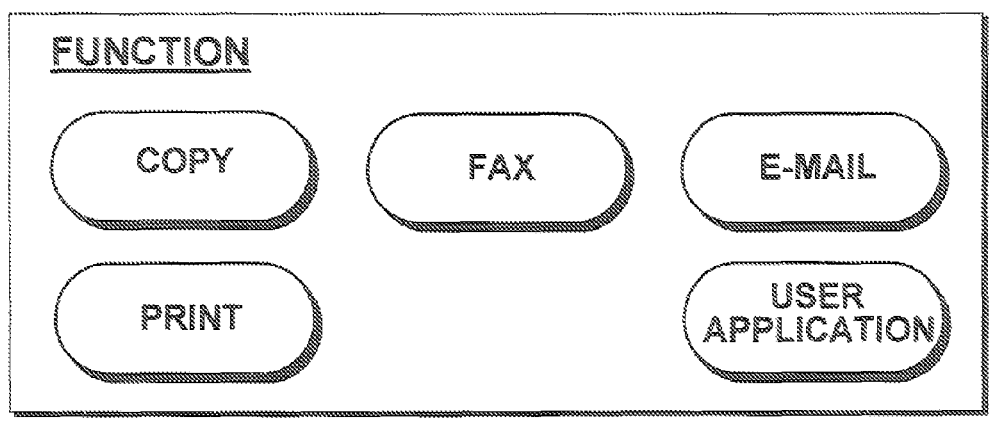
FIG. 21A shows a diagram that indicates a main menu screen on an operation panel of the image forming apparatus.

On the operation panel 215, a main menu screen is displayed as shown in FIG. 21A. If a user touches (i.e. pushes down) "USER APPLICATION" button in the screen, a process is started along a flowchart shown in FIG. 19. The process displays components other than the text "USER APPLICATION" in FIG. 21B.

Figure 19:
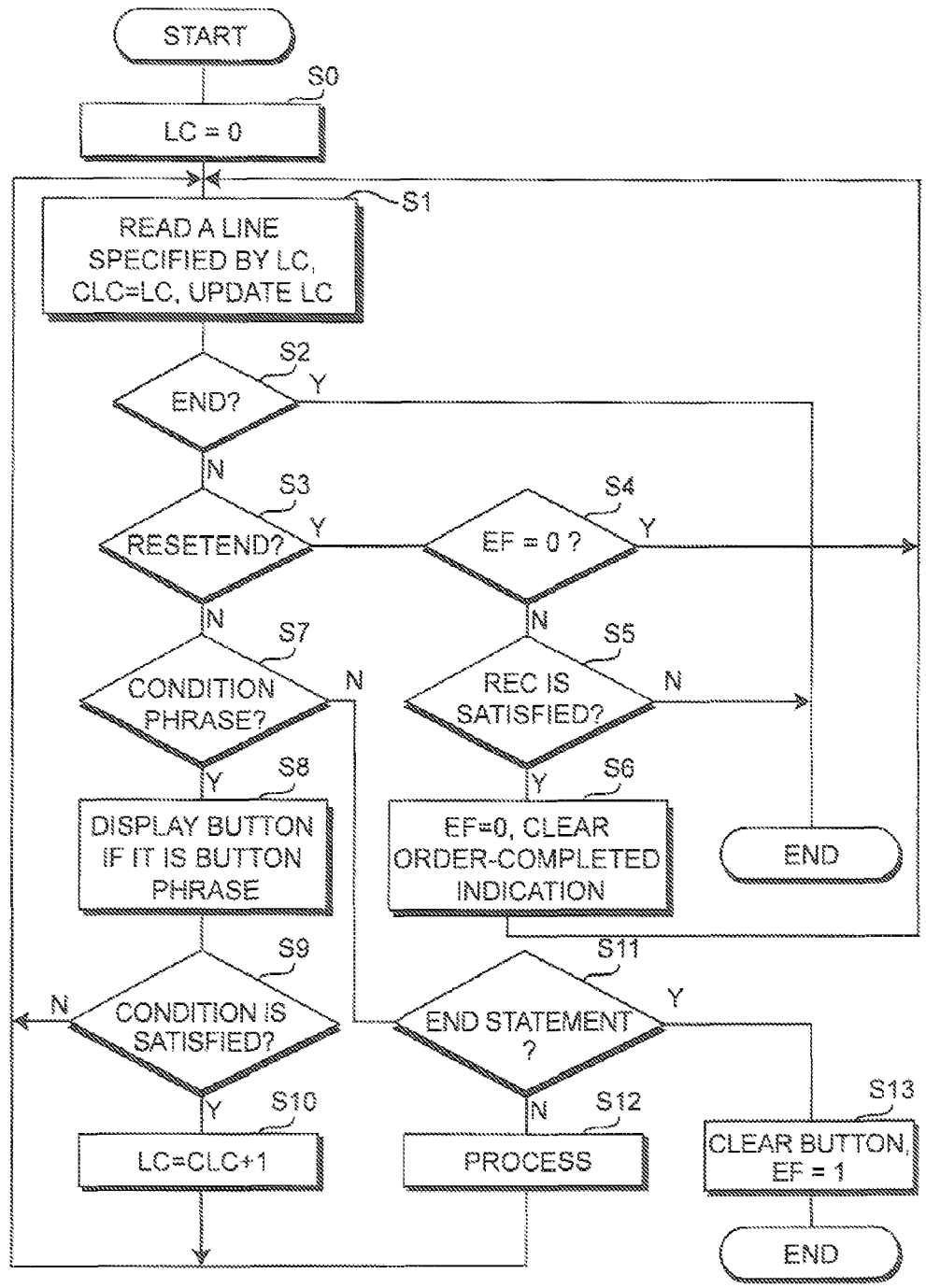
FIG. 19 shows a schematic flowchart that indicates process of a simple text language processing program for a user application in the image forming apparatus according to Embodiment 3 of the present invention.

FIG. 19 shows a schematic flowchart that indicates a process of the simple text language processing program 238 for the user application 237.

This process is started repeatedly, for instance, every 20 milliseconds, by a timer interruption. This process shown in FIG. 19 is explained next.

(Step S0) set the initial value of a counter LC as zero. The counter LC indicates a line number of a line to be processed next in the user application 237.

(Step S1) read out the line specified by the counter LC from the user application 237, set a current line counter CLC as the value of the counter LC, and then set the counter LC as the line number of a statement next to the statement in the line specified by the counter CLC. A delimiter of the statement is either a semicolon or a close brace as well as ones in C language. In the case shown in FIG. 23A, the LC changes from LC=0 to LC=1, and changes LC=1 to LC=7 if the condition in Line 1 is not satisfied, or changes LC=1 to LC=2 if the condition in Line 1 is satisfied at Step S10 mentioned below.

(Step S2) end this process if the line to be read out does not exist, otherwise go to Step S3.

(Step S3) go to Step S4 if the statement is a ResetEnd statement, otherwise go to Step S7.

(Step S4) return to Step S1 if the value of an end flag EF is "0", or go to Step S5 if the value of the end flag EF is "1".

(Step S5) determine whether or not a condition expression (REC) between braces in the ResetEnd statement is satisfied; go to Step S6 if the condition expression is satisfied, otherwise end this process shown in FIG. 19.

(Step S6) reset the end flag EF to "0", clear the order-completed indication mentioned below on the operation panel 215, and return to Step S1.

(Step S7) go to Step S8 if the line specified by the CLC contains a condition phrase, otherwise go to Step S11.

In the case shown in FIG. 23A, "If Toner.Level<Level.Low1 {" in the line of LC=1 and "Button (120, 80, 60, 30, CARTRIDGE ORDER & CrLf & REMAIN & Toner.Level.ToPages & SHEETS) {" in the line of LC=2 are condition phrases.

The latter has been simplified from the condition phrase (with the Button phrase) "If Button(120, 80, 60, 30, CARTRIDGE ORDER & CrLf & REMAIN & Toner.Level. ToPages & SHEETS) is pushed {". Due to this simplification, a nest structure in condition statements is hidden, and consequently, the user application 237 is clear and easy to write.

Figure 21B:
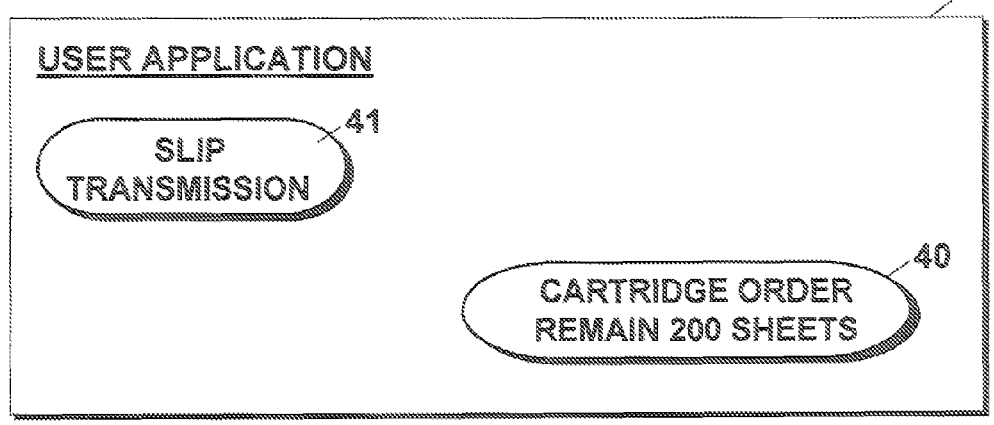
FIG. 21B shows a diagram that indicates a menu screen after the button "USER APPLICATION" is pushed down.

(Step S8) if the line specified by the CLC contains a Button phrase, generate data to display a button based on arguments of the Button phrase, and cause the operation panel 215 to display the button based on the data, for example, a button 240 shown in FIG. 21B.

The Button phrase of LC=2 contains the arguments "120, 80, 60, 30, CARTRIDGE ORDER & CrLf & REMAIN & Toner.Level.ToPages & SHEETS". The arguments "120, 80" mean X-Y coordinates of the top left corner of the button in the operation panel 215. The arguments "60, 30" mean the width and the height of the button. The argument "CARTRIDGE ORDER & CrLf & REMAIN & Toner.Level. ToPages & SHEETS" means the text to be indicated on the button. In the text, "&" is a concatenation operator of texts, "CrLf" is a control code for carriage return, "Toner.Level-.ToPages" means the estimated number of available printing sheets derived from the detected remaining amount of toner mentioned above. Generating data to display the button and displaying the button are performed with functions in the operation panel control module 330 and the operation panel module 355.

Right after the button is displayed, an internal flag F is set, and afterward, if in Step S8 it is determined that the flag F has been set, generating the data of the button is omitted.

(Step S9) determine whether or not a condition expression in the condition phrase is satisfied, go to Step S10 if it is determined that it is satisfied, otherwise return to Step S1.

(Step S10) update the value of the counter LC with the value CLC+1 if the condition expression is satisfied, and return to Step S1.

(Step S11) go to Step S13 if the line specified by the line counter CLC is an End statement, otherwise go to Step S12.

(Step S12) process the line specified by the counter CLC, and then return to Step S1.

(Step S13) execute the End statement, and then end the process shown in FIG. 19. Specifically, the button displayed on the operation panel 215 in Step S8 is cleared, the internal flag F is unset, and the end flag EF is set.

In the following part, instances of the process shown in FIG. 19 are explained, i.e. in case of the user application 237 shown in FIG. 23A. In this case, the initial value of the end flag EF has been set as "1".

Figure 20:
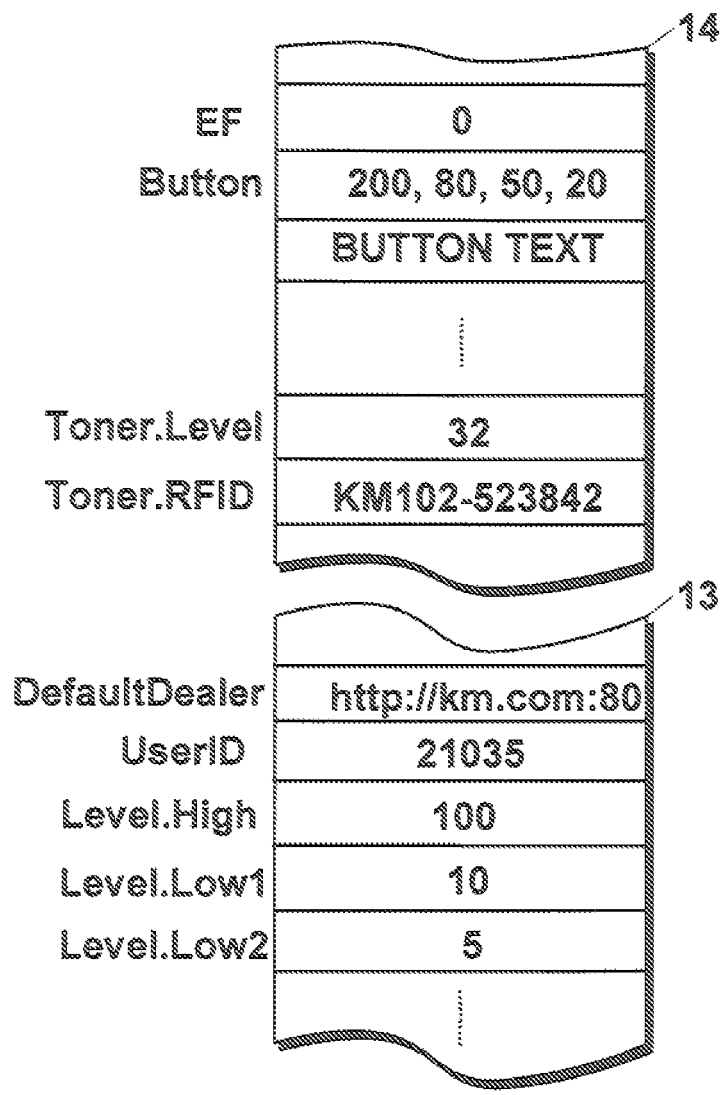
FIG. 20 shows a diagram that indicates a part of data stored in PROM and DRAM in the image forming apparatus according to Embodiment 3 of the present invention.

(Process 1)
In Step S0, the LC is set as zero by a timer interruption. In Step S1, "ResetEnd(Toner.Level>Level.High)" is read out from the line of LC=0, the CLC is set as 0, and the LC is set as 1. Through Steps S2, S3 and S4, in Step S5, determined is whether the condition expression "Toner.Level>Level.High" in the ResetEnd statement is satisfied or not. Right after a new toner cartridge is mounted, the condition expression is satisfied, and consequently, the EF is unset as 0 in Step S6. Here, the threshold value Level.High has been stored in the PROM 213 in advance as shown in FIG. 20 together with other threshold values such as Level.Low1, Level.Low2, and the like mentioned below.

Return to Step S1, "If Toner.Level<Level.Low1 {" is read out from the line of LC=1, the CLC is set as 1, and the LC is set as 7. Through Steps S2, S3, S7 and S8, in Step S9, determined is whether the condition expression "Toner.Level<Level.Low1" is satisfied or not. The condition expression is not satisfied, and therefore, return to Step S1. In Step S1, Null is read out from the line of LC=7, and in Step S2 it is determined that the line to be read out does not exist, and then the process ends.

(Process 2)
When the next timer interruption takes place, the LC is set as 0 in Step S0. In Step S1, "ResetEnd (Toner.Level>Level.High)" is read out from the line of LC=0, the CLC is set as 0, and the LC is set as 1. Through Steps S2 and S3, in Step S4, it is determined that EF=0, and then return to Step 1. In Step S1, "If Toner.Level<Level.Low1" is read out from the line of LC=1, the CLC is set as 1, and the LC is set as 7. Through Steps S2, S3, S7 and S8, in Step S9, determined is whether the condition expression "Toner.Level<Level.Low1" is satisfied or not. The condition expression is not satisfied, and therefore, return to Step S1. In Step S1, Null is read out from the line of LC=7, and in Step S2 it is determined that the line to be read out does not exist, and then the process ends.

Until the condition expression is satisfied, Process 2 is executed repeatedly.

(Process 3)
As shown in FIG. 22, the remaining amount of toner Toner.Level decreases with the passage of time. When the Toner.Level becomes less than the preset threshold value Level. Low1, the condition expression "Toner.Level<Level.Low1" is satisfied.

In Step S0, the LC is set as 0 by a timer interruption. In Step S1, "ResetEnd(Toner.Level>Level.High)" is read out from the line of LC=0, the CLC is set as 0, and the LC is set as 1. Through Steps S2 and S3, in Step S4, it is determined that EF=0, and then return to Step 1. In Step S1, "If Toner.Level<Level.Low1" is read out from the line of LC=1, the CLC is set as 1, and the LC is set as 7. Through Steps S2, S3, S7 and S8, in Step S9, determined is whether the condition expression "Toner.Level<Level.Low1" is satisfied or not. The condition expression is satisfied, and therefore, go to Step S10. In Step S10, the LC is set as 2, and return to Step S1. In Step S1, "Button(120, 80, 60, 30, CARTRIDGE ORDER & CrLf & REMAIN & Toner.Level.ToPages & SHEETS) {" is read out from the line of LC=2, the CLC is set as 2, and the LC is set as 7 (i.e. the next line of the close brace in line 6). Through Steps S2, S3 and S7, in Step S8, data to be display the button 240 is generated as mentioned above, and the button 240 is displayed on the operation panel 215 and then the internal flag F is set. If a touch (push-down) operation has not been detected in the area where the button 240 is displayed (specified by the arguments 120, 80, 60, 30), it is determined that the condition is not satisfied in Step S9, and then return to Step S1. In Step S1, Null is read out from the line of LC=7, and in Step S2, it is determined that the line to be read out does not exist, and then the process ends.

Until a touch (push-down) operation is detected on the area of the button 240, Process 3 is executed repeatedly.

(Process 4)
If a touch (push-down) operation is detected on the area of the button 240, it is determined that the condition is satisfied in Step S9, and therefore, in Step S10 the LC is set as 3, and then return to Step S1. In Step S1, "Order(Toner.RFID To DefaultDealer)" is read out from the line of LC=3, the CLC is set as 3, and the LC is set as 4. Through Steps S2, S3, S7 and S11, in Step S12, the line of CLC=3 is processed. Specifically, an HTTP request message is generated and transmitted to the web server machine 227 as the address "DefaultDealer" (e.g. http://km.com:80 shown in FIG. 20) via the NIC 218 and the Internet 226. The HTTP request message contains the toner cartridge type contained in Toner.RFID, and a user ID that does not appear in the Order statement. The request line of this message may be "GET /cgi-bin/order.cgi?UserID=21035&Type=KM102 HTTP/1.0", for example. Here, as shown in FIG. 20, "UserID=21035" has been stored in the PROM 213 in advance. "Type=KM102" means the toner cartridge type that is a part of content of Toner.RFID. HTTP messages are transmitted/received in terms of the HTTP processing module 339 and the OS 230.

The web server machine 227 receives this HTTP request message, and starts a CGI program at the path "/cgi-bin/order.cgi" specified in the message with an argument which the query string "UserID=21035&Type=KM102" in the message is set to. As a result, as shown in FIG. 26, the order time, the toner cartridge type, a customer ID and an estimated shipping date are registered in a table TBL1. The order time is the date and time when the order is received. The customer ID is the same as the user ID. The estimated shipping date is decided based on a state of the inventory that identified from the result of retrieving an inventory database 229 with a key which the toner cartridge type is set to. A done flag in the table TBL1 has been unset until the shipping, and is set at the shipping. The table TBL1 is linked to a customer information table TBL2 that contains fields of a customer ID, a company name, an address, a name of a person in charge, a name of a section which the person belongs to, a telephone number, a facsimile number, and so on. The table TBL1 and the table TBL2 constitute a relational database.

Figure 21C:
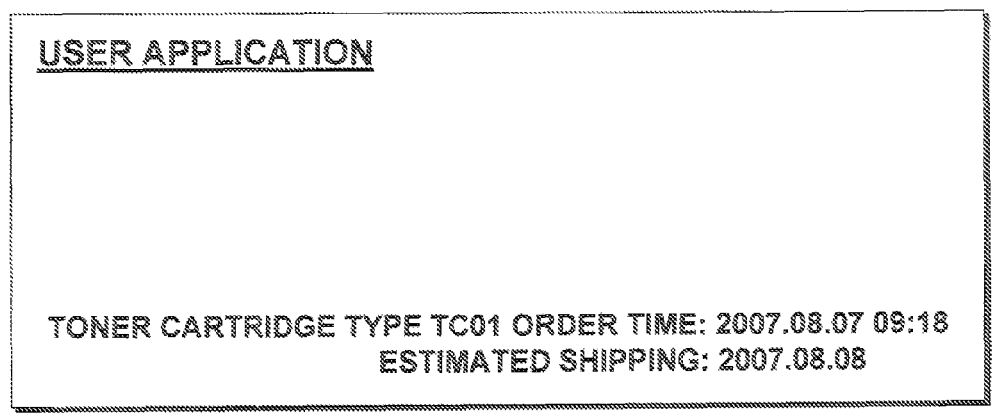
FIG. 21C shows a diagram that indicates a screen after the button 40 in FIG. 21B is pushed down.

The web server machine 227 generates an HTTP response message that contains the order time, the toner cartridge type, the estimated shipping date, and transmits the message to the image forming apparatus 210. The HTTP response message is generated based on a template file. The image forming apparatus 210 receives the message, and displays content of the message on the operation panel 215 as shown in FIG. 21C.

After the aforementioned process for the line of CLC=3 is finished, return to Step S1, and then "End;" is read out from the line of LC=4, the CLC is set as 4, and the LC is set as 7. Through Steps S2, S3, S7 and S11, in Step S13, "End;" in the line of CLC=4 is processed. Specifically, the button 240 displayed on the operation panel 215 is cleared, the internal flag F is unset, and the end flag EF is set.

Therefore, until a new toner cartridge is mounted, it is determined that the EF is not 0 and the REC is not satisfied in Steps S4 and S5 even if the process shown in FIG. 19 is started by a timer interruption, and consequently, the toner cartridge order button 240 is not displayed on the operation panel 215, but the order-completed indication is kept displaying.

After Process 4, if a new toner cartridge is mounted as shown in FIG. 22, the condition in the ResetEnd statement becomes satisfied. Consequently, Process 1 is performed, and through Step S5, the EF is unset as 0 in Step S6, and the order-completed indication on the operation panel 215 is cleared.

If it is not necessary to order a toner cartridge because a toner cartridge is in the inventory, when the toner cartridge is changed, the MPU 211 reads out the output of the electronic tag reader 223 according to a program other than one shown in FIG. 19, and stores the output in the DRAM 214 as Toner.RFID shown in FIG. 20. In this time, a process same as Step S13 in FIG. 19 is executed according to the program. Therefore, until "Toner.Level<Level.Low1" is satisfied, the toner cartridge order button 240 is not displayed on the operation panel 215.

As mentioned above, according to Embodiment 3, the user application contains the conditioned reset end statement ResetEnd, and a pair of attribution information and an Order statement. A user operation to the button 240 is detected when a condition in the statement ResetEnd is satisfied according to the language processing program 238. Upon detecting the user operation, the Order statement is executed. Therefore, it is possible to use a non-complex description in the user application capable of changing a user interface according to a condition, even if condition statements are nested.

Specifically, it is possible to use a non-complex description in the user application capable of changing a user interface according to a condition, even if an additional if statement is nested to the condition statements.

Further, the button 240 is displayed as an icon on the operation panel 215 based on the attribution information "120, 80, 60, 30, CARTRIDGE ORDER & CrLf & REMAIN & Toner.Level.ToPages & SHEETS" described in the user application, and upon detecting a user operation to the button 240, consumable-goods order information is transmitted to the address via the NIC 218 based on the consumable-goods order statement "Order(Toner.RFID To DefaultDealer)" described in the user application. Therefore, due to a non-complex description in the user application, a user can order consumable goods easily. In addition, consumable goods can be ordered at an adequate timing even if a consuming rate of consumable goods increases or decrease sharply contrary to an expectation.

Further, the attribution information on the button 240 contains a description of a consumption state "REMAIN & Toner.Level.ToPages & SHEETS", and the detected consumption state is displayed on the operation panel 215 based on the description. Therefore, it is possible to order consumable goods at an adequate timing with a simple description.

Further, the consumption state is displayed in the indication area "120, 80, 60, 30" of the button 240. Therefore, high usability is achieved.

Further, since Step S4 is performed before Step S5, while the end flag EF is set, a condition expression in the reset end statement ResetEnd is not checked. Therefore, a user operation to the button 240 can be detected without complex statements in a user application even if the detected value of the remaining amount of toner is changed due to a mechanical vibration.

Further, ordering consumable-goods is displayed on the operation panel 215 after the consumable-goods order information is transmitted, and therefore, other users are prevented from ordering the same consumable-goods again by mistake.

Furthermore, the button 240 on the operation panel 215 is deleted after the consumable-goods order information is transmitted, and therefore, high usability is achieved and other users are prevented from ordering the same consumable-goods again by mistake.

Further, the button 240 is deleted according to the end statement End contained in the user application, and therefore, in terms of a simple description (i.e. End statement), it is possible to delete the button 240.

Further, the toner cartridge type is read out from the electronic tag and inserted into the order information automatically rather than manually.

FIGS. 23B and 23C show user applications in which an order method is different from one in the user application shown in FIG. 23A.

In the case shown in FIG. 23B, as a cartridge ordering process, "Fax cartridgeOrderFile.pdf to ADDRESSBOOK (dealer1, fax)" is performed with the FAX module 352 in Step S12 in FIG. 19. According to this statement, content of the file "cartridgeOrderFile.pdf" is transmitted to the address. A return value of the function "ADDRESSBOOK(dealer1, fax)" is set to the address. In the address book, a facsimile number and an email address has been registered in a record of each of addresses. The argument "fax" means that the function returns a facsimile number in the record specified by the argument "dealer1".

In the case shown in FIG. 23C, as a cartridge ordering process, "Email cartridgeOrderFile.pdf to ADDRESSBOOK (dealer1, email)" is performed with the email module 353 in Step S12 in FIG. 19. According to this statement, content of the file "cartridgeOrderFile.pdf" is transmitted to the address. A return value of the function "ADDRESSBOOK(dealer1, email)" is set to the address. The argument "email" means that the function returns an email address in the record specified by the argument "dealer1".

The process shown in FIG. 19 can be applied to user applications without relation to consumable-goods ordering. Instances of the user applications are shown in FIGS. 24A to 24C.

In the following part, the process of FIG. 19 applied to the user application shown in FIG. 24A is explained.

(Process 5)

In Step S0, the LC is set as 0 by a timer interruption. In Step S1, "Button(20, 30, 60, 30, SLIP TRANSMISSION) {" is read out from the line of LC=0, the CLC is set as 0, and the LC is set as 5. Through Steps S2, S3 and S7, in Step S8, the button 241 shown in FIG. 21B is displayed, and the internal flag F is set. If a touch (push-down) operation has not been detected in the area where the button 240 is displayed (specified by the arguments 20, 30, 60, 30), it is determined that the condition is not satisfied in Step S9, and then return to Step S1. In Step S1, Null is read out from the line of LC=5, and in Step S2, it is determined that the line to be read out does not exist, and then the process ends.

Until a touch (push-down) operation is detected on the area of the button 241, Process 5 is executed repeatedly.

(Process 6)

If a user puts a document on a flatbed and pushes down the button 241, the condition in Step S9 is satisfied and the LC is set as 1 in Step S10, and then return to Step S1.

In Step S1, "file.pdf=Scan" is read out from the line of LC=1, the CLC is set as 1, and the LC is set as 2. Through Steps S2, S3, S7 and S11, in Step S12, the line of CLC=1 is processed. Specifically, the scanner 217 scans an image of the document to generate image data, converts the image data to the PDF format, and generates a PDF file "file.pdf" that contains the converted image data.

Return to Step S1, and "Fax file.pdf to ADDRESSBOOK (HEADQUARTER ACCOUNTING DEPARTMENT, fax)" is read out from the line of LC=2, the CLC is set as 2, and the LC is set as 3. Through Steps S2, S3, S7 and S11, in Step S12, the line of CLC=2 is processed. Specifically, content of the file "file.pdf" is transmitted to the address that is a return value of "ADDRESSBOOK(HEADQUARTER ACCOUNTING DEPARTMENT, fax)".

Return to Step S1, "Email file.pdf to ADDRESSBOOK (TARO SASAKI, email)" is read out from the line of LC=3, the CLC is set as 3, and the LC is set as 5. Through Steps S2, S3, S7 and S11, in Step S12, the line of CLC=3 is processed. Specifically, content of the file "file.pdf" is transmitted via email to the address that is a return value of "ADDRESSBOOK(TARO SASAKI, email)". For example, it is possible to transmit a copy of a facsimile document via email to the user himself/herself who sends the facsimile document.

In Step S1, Null is read out from the line of LC=5, and in Step S2, it is determined that the line to be read out does not exist, and then the process ends. The button 241 continues to be displayed on the operation panel 215.

In case of the user application shown in FIG. 24B, the aforementioned process is executed, and after the email is transmitted, the End statement is processed, and therefore, in Step S13, the button 241 on the operation panel 215 is cleared, the internal flag F is unset, and the end flag EF is set.

In case of the user application shown in FIG. 24C, before the process same as one of the user application shown in FIG. 24B, in Step S12, "ResetEnd(ICcardID=KM01)" in the line of CLC=1 is processed. Specifically, the IC card reader 222 reads out a user ID and an encrypted password via radio wave from user's IC card 224B. On the other hand, a user ID and a twice-encrypted password are read out from the PROM 213, the twice-encrypted password is decrypted once, and then the user ID and the encrypted password from the IC card 224B are verified with the user ID and the once-encrypted password from the PROM 213. If both of the user IDs and both of the encrypted passwords are identical, i.e. if the user who has the user ID "KM01" is authenticated successfully, the condition in the ResetEnd statement is satisfied in Step S5, and the EF is unset as 0 in Step S6. After the ResetEnd statement, executed is the process same as one of the user application shown in FIG. 24B.

If the user authentication is failed, the in Step S5 it is determined that the condition in the ResetEnd statement is not satisfied, and then, the process ends. As a result, the button 241 is not displayed on the operation panel 215.

Therefore, only for valid users, the button 241 is always displayed on the operation panel 215, and the aforementioned process is executed, and then the button 241 is deleted when the process is finished. According to such simple user applications, different user interfaces can be established for respective users.

The description of the present invention has been presented for purposes of illustration and description, and is not intended to be exhaustive or limited to the invention in the form disclosed. Many modifications and variations will be apparent to those of ordinary skill in the art.

For example, although a multi function peripheral is explained as an instance of the image forming apparatus in Embodiment 1, the image forming apparatus may be a printer, a facsimile machine, a scanner, or the like.

Further, in Embodiment 1, pieces of the service definition data 15a may be prepared for respective usecases. Each of the usecases contains a series of services.

Further, although the service definition data 15a is described in WSDL in Embodiment 1, the service definition data 15a may be described in another language capable of describing as well as WSDL. Further, in the schema data 15b and the service definition data 15a, the schema may be described in a language different from XML Schema. In this case, the service definition data 15a and the schema data 15b have to be text data that can be edited easily.

Further, in Embodiment 1, the service definition data 15a and/or the schema data 15b may be stored in a server device accessible via the computer network 2, and the multi function peripheral 1 may download and use the service definition data 15a and/or the schema data 15b.

Further, although a multi function peripheral is explained as an instance of the image forming apparatus in Embodiment 2, the image forming apparatus may be a printer, a facsimile machine, a scanner, or the like.

Further, in Embodiment 2, pieces of the service definition data 15a may be prepared for respective usecases. Each of the usecases contains a series of services.

Further, although the service definition data 115a is described in WSDL in Embodiment 2, the service definition data 115a may be described in another language capable of describing as well as WSDL. Further, in the schema data 115b and the service definition data 115a, the schema may be described in a language different from XML Schema. In this case, the service definition data 115a and the schema data 115b have to be text data that can be edited easily.

Further, in Embodiment 2, the service definition data 115a and/or the schema data 115b may be stored in a server device accessible via the computer network 102, and the multi function peripheral 101 may download and use the service definition data 115a and/or the schema data 115b.

Further, in Embodiment 2, the service definition data 115a and the schema data 115b may contain attribution information on the display device 111a such as type, resolution, color type (color or monochrome), and the attribution information may be displayed in the terminal device 103 at the customization. For instance, the type of the display device 111a may be a two-raw by two-column liquid crystal display, a dot-matrix display, an 8.5 inch full color liquid crystal panel, etc.

Further, in Embodiment 2, an operation command for changing a layout of buttons etc. on the screen may be described in the procedure_string element. If the command is described, the screen is changed to another screen on which the buttons and so on are displayed in another layout when the button is pushed down.

Further, in Embodiment 2, an operation command described in the procedure_string element may be the name of a service defined in the service definition data 115a. Specifically, syntax definitions of a service such as scan service provided by the multi function peripheral 101 are described in the service definition data 115a, and when the button is operated, a message compatible with the syntax transmits from the operation panel 111 to the XML processing unit 122, and the multi function peripheral 101 operates for the service. Further, in Embodiment 2, a series of operation commands may be described in XML in one or more child elements of the procedure_string element.

Further, in Embodiment 3, a plurality of application programs may be prepared or a plurality of pairs of a condition phrase and a process statement may be described in an application program. If do so, three or more buttons can be displayed on the screen shown in FIG. 21B in order to process daily business.

Further, in Embodiment 3, icons displayed on the operation panel 215 may have various kinds of shapes.

Further, in Embodiment 3, an interactive input/output device of a computer system may be used instead of the operation panel. The interactive input/output device (i.e. a remote console) is connected to the communicating device of the image forming apparatus. In this case, the icon is pushed down by clicking on a mouse of the device.

What is claimed is:

1. An image forming apparatus, comprising:
   a processor;
   a storage unit that a text language processing program has been stored;
   an operation panel;
   a communication interface; and
   an input unit;
   wherein a user application is stored in the storage unit, and the user application includes descriptions on (a) a conditioned reset statement with a first condition expression that includes an input value from the input unit and (b) a pair of (b1) at least one process executing statement and (b2) an attribution of an icon to be displayed on either a remote console via the communication interface or the operation panel; and
   the text language processing program is configured to cause the processor (a) to interpret the user application, (b) to determine whether the first condition expression is satisfied or not, (c) to detect a user operation to the icon, if a result of the determination is a predetermined one, and (d) upon detecting the user operation, to execute the at least one process executing statement.

2. The image forming apparatus according to claim 1, wherein:
   the text language processing program is further configured to cause the processor to display the icon based on the attribution of the icon on either the operation panel and the remote console, and to delete the icon on either the operation panel or the remote console after the at least one process executing statement is executed.

3. The image forming apparatus according to claim 1, wherein:
   an END statement is described after the pair in the user application, and
   the text language processing program is further configured to cause the processor to display the icon based on the attribution of the icon on either the operation panel or the remote console, and to delete the icon at the END statement.

4. The image forming apparatus according to claim 1, wherein:
   the input unit is a detecting unit configured to detect a consumption status of consumable goods;
   the at least one process executing statement includes a statement for ordering the consumable goods via the communication interface; and
   the first condition expression expresses that the detected consumption status does not reach a predetermined first consumption status.

5. The image forming apparatus according to claim 4, wherein:
   a condition statement is described between the conditioned reset statement and the pair in the user application, and the condition statement includes a second condition expression;
   the second condition expression expresses that the detected consumption status reaches a predetermined second consumption status;
   a consumption amount at the second consumption status is larger than a consumption amount at the first consumption status; and
   the text language processing program is further configured to cause the processor to determine whether the processor interprets the pair or not according to whether the second condition expression is satisfied or not.

6. The image forming apparatus according to claim 5, wherein:
   an END statement is described after the pair in the user application,
   the text language processing program is further configured to cause the processor to display the icon based on the attribution of the icon on either the operation panel or the remote console, and to delete the icon at the END statement
   a consumable-goods management status data is stored in the storage unit; and
   the text language processing program is further configured to cause the processor to set "VALID" to the consumable-goods management status data if it is determined that the first condition expression is satisfied, to set "INVALID" to the consumable-goods management status data at the END statement, and to determine that the first condition expression is satisfied without checking the first condition expression if the consumable-goods management status data is "VALID".

7. The image forming apparatus according to claim 6, wherein:
   the consumption status is a remaining amount of toner in a toner cartridge.

8. The image forming apparatus according to claim 1, wherein:
   the input unit is an IC card reader; and
   the first condition expression expresses either that a user ID read by the IC card reader is a predetermined one or not.

* * * * *